(12) United States Patent
Wang et al.

(10) Patent No.: US 7,481,368 B2
(45) Date of Patent: Jan. 27, 2009

(54) SYSTEMS, DEVICES, AND METHODS FOR MANAGING RFID DATA

(75) Inventors: Fusheng Wang, Plainsboro, NJ (US); Peiya Liu, East Brunswick, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 246 days.

(21) Appl. No.: 11/295,411

(22) Filed: Dec. 6, 2005

(65) Prior Publication Data

US 2006/0124738 A1 Jun. 15, 2006

Related U.S. Application Data

(60) Provisional application No. 60/645,694, filed on Jan. 21, 2005, provisional application No. 60/641,788, filed on Jan. 6, 2005, provisional application No. 60/635,874, filed on Dec. 14, 2004.

(51) Int. Cl.
*G06F 19/00* (2006.01)

(52) U.S. Cl. .................. 235/385; 235/375; 235/383; 235/384

(58) Field of Classification Search ............ 235/375, 235/383–385, 492
See application file for complete search history.

(56) References Cited

U.S. PATENT DOCUMENTS

| | | | |
|---|---|---|---|
| 5,635,693 A | 6/1997 | Benson | |
| 5,886,634 A * | 3/1999 | Muhme | 340/572.1 |
| 5,910,776 A | 6/1999 | Black et al. | |
| 5,959,568 A * | 9/1999 | Woolley | 342/42 |
| 6,496,806 B1 * | 12/2002 | Horwitz et al. | 705/28 |
| 6,600,418 B2 | 7/2003 | Francis et al. | |
| 6,621,417 B2 | 9/2003 | Duncan | |
| 6,745,027 B2 * | 6/2004 | Twitchell, Jr. | 455/422.1 |
| 6,908,034 B2 * | 6/2005 | Alleshouse | 235/432 |
| 6,966,489 B2 * | 11/2005 | Grant | 235/381 |
| 6,992,574 B2 * | 1/2006 | Aupperle et al. | 340/505 |
| 7,121,457 B2 * | 10/2006 | Michal, III | 235/375 |
| 7,155,304 B1 * | 12/2006 | Charych | 700/214 |
| 7,243,476 B2 * | 7/2007 | Schneider | 53/399 |
| 2002/0147650 A1 | 10/2002 | Kaufman et al. | |
| 2002/0185532 A1 | 12/2002 | Berquist | |
| 2002/0190862 A1 | 12/2002 | Berquist | |
| 2003/0169149 A1 | 9/2003 | Ohki | |
| 2003/0229492 A1 * | 12/2003 | Nolan | 704/247 |
| 2004/0153463 A1 | 8/2004 | Sasai | |
| 2005/0004702 A1 | 1/2005 | McDonald | |

(Continued)

FOREIGN PATENT DOCUMENTS

WO    WO 2004/006051 A    1/2004

OTHER PUBLICATIONS

M. Harrison, "EPC Information Service—Data Model and Queries," Auto-ID Centre White Papers from Cambridge, UK, Oct. 2003.

(Continued)

*Primary Examiner*—Seung H Lee

(57) ABSTRACT

Certain exemplary embodiments comprise a database table comprising a plurality of records, each of the plurality of records comprising an identification of an object, and an identification of a particular location of the object, each particular location of the object automatically determined responsive to automatically generatable, automatically receivable, radio frequency identification information.

26 Claims, 20 Drawing Sheets

U.S. PATENT DOCUMENTS

2005/0010497 A1* 1/2005 Kinjo .......................... 705/27
2005/0092825 A1 5/2005 Cox
2005/0150952 A1 7/2005 Chung

OTHER PUBLICATIONS

M. Harrison, J. Brusey et al. "PML Server Developments," Auto-ID Centre White Papers from Cambridge, UK, Oct. 2003.

"Developing Auto-ID Solutions using Sun Java System RFID Software," http://java.suncom/developer/technicalArticles/Ecommerce/rfid/sisrfid/RFID.html.

P.P.-S. Chen, "The Entity-Relationship Model—Towards a Unified View of Data," ACM Trans. Database Systems, vol. 1. No. 1, pp. 9-36, Mar. 1976.

H. Gregersen, C. S. Jensen, "Temporal Entity-Relationship Models—a Survey," IEEE Transactions on Knowledge and Data Engineering, vol. 11, No. 3, May/Jun. 1999.

"Oracle Sensor Edge Server Oracle AS 10g Release 2", http://download-ast.oracle.com/oowsf2004/1339_wp.pdf.

C. Bomhoevd, T. Lin, S. Haller and J. Schaper, "Integrating Automatic Data Acquisition with Business Processes—Experiences with SAP's Auto-ID Infrastructure." VLDB 2004.

S. Clark, K. Traub, D. Anarkat, and T. Osinski, "Auto-ID Savant Specification 1.0", Auto-ID Center White Paper, Sep. 2003.

D. Brock and C. Cummins, "EPCTM Tag Data Standards Version 1.1 Rev. 1.24", EPCGlobal Whitepaper, Apr. 2004.

IBM WebSphere RFID Premises Server, http://www-306.ibm.com/software/pervasive/ws_rfid_premises_server, Dec. 2004.

Oracle Sensor Edge Server Oracle AS 10g Release 2, http://download-east.oracle.com/oowsf2004/1339_wp.pdf.

PML Core Specificatin 1.0, Auto-ID Center White Paper, 2003.

* cited by examiner

```
S1. Define WITH RECURSIVE a view ALL_SUB (parentepc,epc) as the union
    of the following two queries:

SA: Select (parentepc, epc) from CONTAINMENT, where parentepc equals 'pepc';

SB: Select parentepc from ALL_SUB, epc from CONTAINMENT, where ALL_SUB's epc
        equals CONTAINMENT's parentepc;

S2. Select all records from ALL_SUB.
```

```xml
<rfid>
<enterprise>
<name>Supplier</name>
<id>ent001</id>
</enterprise>
<objects>
<object id="epc100">
<classid>12345</classid>
<observations>
<observation timestamp="11-01-2004">
<readerepc>epc001</readerepc>
</observation>
<observation timestamp="11-11-2004">
<readerepc>epc002</readerepc>
</observation>
</observations>
<locations>
<location tstart="11-01-2004" tend="11-10-2004">
<locationid>loc01</locationid>
</location>
<location tstart="11-11-2004" tend="12-31-9999">
<locationid>loc01</locationid>
</location>
</locations>
<containers>
<container idref="epc500" tstart="11-01-2004" tend="11-10-2004"/>
<container idref="epc500" tstart="11-11-2004" tend="12-31-9999"/>
</containers>
</object>
</objects>
<readers>
<reader id="epc001">
<locations>
<location>
<locationid>loc01</locationid>
</location>
</locations>
</reader>
</readers>
<locations>
<location id="loc01">
<name>Warehouse</name>
<owner>Supplier A</owner>
</location>
</locations>
<transactions>
<transaction id="tx001">
<items>
<item id="epc100"/>
<item id="epc200"/>
</items>
</transaction>
</transactions>
</rfid>
```

Fig. 16

| Reader Location / RFID Tables | Location 1 (Warehouse) | Location 2 (Loading Area) | Location 3 (Retailer Warehouse) | Location 4 (Customer) |
|---|---|---|---|---|
| READER | x | x | x | x |
| OBJECT | x | | | |
| LOCATION | x | x | x | x |
| TRANSACTION | | | | x |
| OBSERVATION | x | x | x | x |
| CONTAINMENT | x | | x | |
| OBJECTLOCATION | | x | | x |
| TRANSACTIONITEM | | | | x |

SYSTEMS, DEVICES, AND METHODS FOR MANAGING RFID DATA

CROSS-REFERENCES TO RELATED APPLICATIONS

This application claims priority to, and incorporates by reference in their entirety, each of the following pending U.S. Provisional Patent Applications:
  Ser. No. 60/635,874, filed 14 Dec. 2004;
  Ser. No. 60/641,788 filed 6 Jan. 2005; and
  Ser. No. 60/645,694, filed 21 Jan. 2005.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 12 is a flowchart of an exemplary embodiment of a method 12000 for an RFID Object Sibling Search;
FIG. 16 is an XML procedure 16000;
FIG. 17 is a table of relationships 17000.

DEFINITIONS

Figure 1:
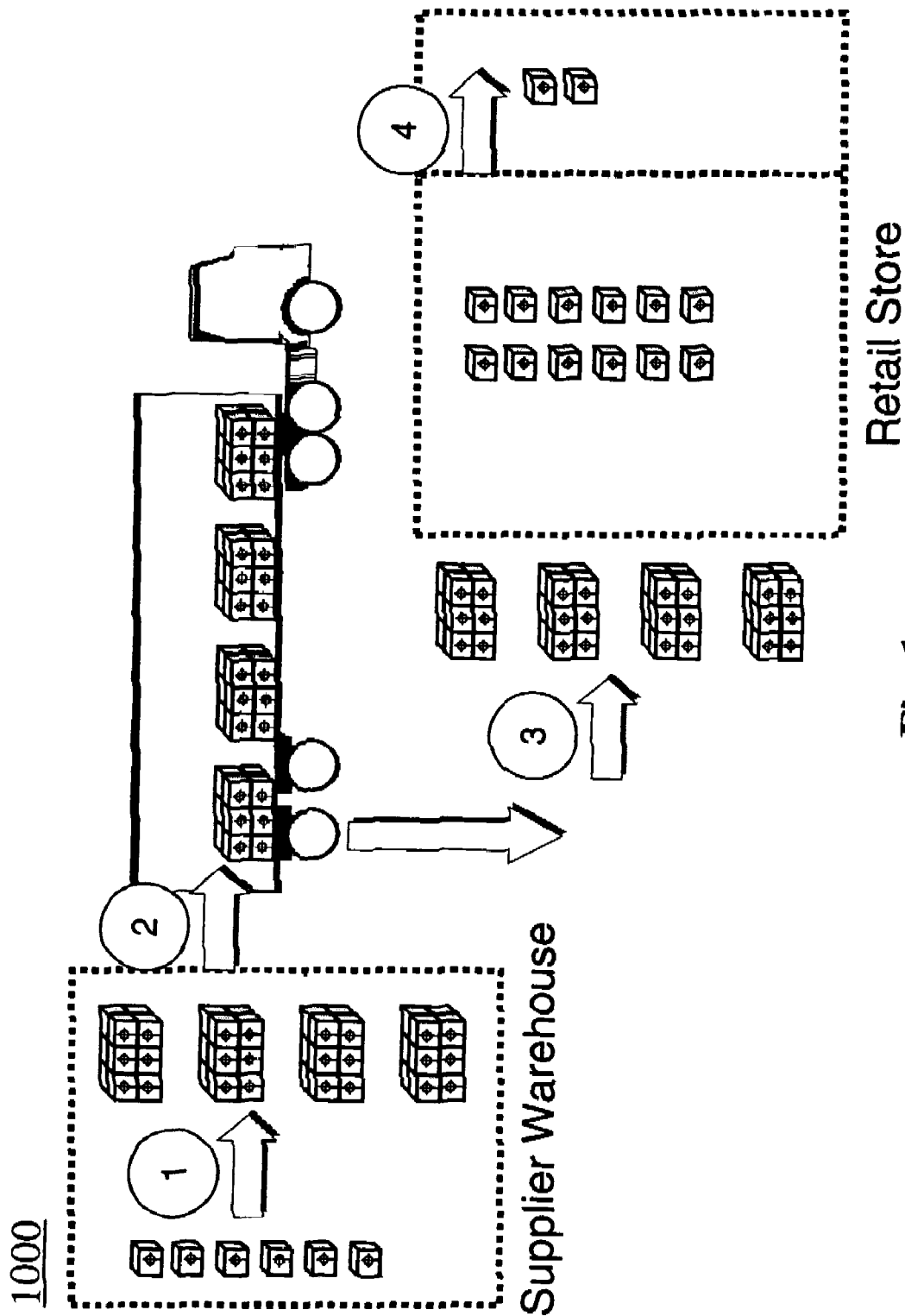
FIG. 1 is a schematic view of an exemplary embodiment of a system 1000.

When the following terms are used substantively herein, the accompanying definitions apply:
  a—at least one.
  activity—an action, act, step, and/or process or portion thereof.
  adapted to—capable of performing a particular function.
  and/or—either in conjunction with or in alternative to.
  application integration interface—hardware, firmware, and/or software adapted to manage radio frequency identification information.
  associated—related to.
  automatically—acting or operating in a manner essentially independent of external influence or control. For example, an automatic light switch can turn on upon "seeing" a person in its view, without the person manually operating the light switch.
  can—is capable of, in at least some embodiments.
  ceased—stopped.
  change—to modify.
  comprising—including but not limited to.
  container—an enclosure adapted to retain one or more objects.
  containment query—one or more machine-readable instructions adapted to find one or more objects associated with a particular container.
  data—distinct pieces of information, usually formatted in a special or predetermined way and/or organized to express concepts.
  database—one or more structured sets of persistent data, usually associated with software to update and query the data. A simple database might be a single file containing many records, each of which is structured using the same set of fields. A database can comprise one or more tables.
  description—a representation of one or more characteristics.
  determine—ascertain, obtain, and/or calculate.
  different—distinct or separate.
  duplicate—to substantially copy.
  establish—to set up.
  event manager—hardware, firmware, and/or software adapted to obtain radio frequency identification information.
  explicit—precisely, clearly, and distinctly defined, stored, rendered, and/or expressed.
  Extensible Markup Language (XML) format—information organized so as to be compatible with an open standard for exchanging structured documents and data over a network that was introduced and defined by the World Wide Web Consortium (W3C) in a recommendation entitled "XML 1.0".
  generate—to produce and/or create via an information device.
  history—a record of temporal events.
  history query—one or more machine-readable instructions adapted to retrieve a history of an object and/or a relationship.
  identification—a moniker or description uniquely defining something.
  indicate—to signify.
  information—processed, stored, and/or transmitted data.
  information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

information reader—a device comprising an antenna and adapted to receive radio frequency identification information from a radio frequency identification transmitter.

instructions—directions adapted to perform a particular operation or function.

interference interval—a time range for which data received from one or more readers will be averaged, smoothed, weighted, ignored, and/or deleted.

location—a place substantially approximating where something physically exists.

machine readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

missing—a state of not being present at an expected location.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

object—an item associated with a radio frequency identification tag.

particular—of, or associated with, a specific entity, thing, person, group, place, activity, and/or category.

plurality—the state of being plural and/or more than one.

populate—to provide data to one or more fields of a database record.

potential—having possibility.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to furnish and/or supply.

query—to request information from a table and/or database.

radio frequency identification (RFID)—a technology wherein electromagnetic or electrostatic coupling in the RF portion of the electromagnetic spectrum is used to transmit signals. An RFID system comprises an antenna and a transceiver, which reads information using radio frequencies and transfers the information to a processing device. An RFID can comprise a transponder, or tag, which is an integrated circuit containing the RF circuitry and information to be transmitted.

reader—a device adapted to receive radio frequency identification information from a radio frequency identification transmitter.

receive—accept something provided and/or given.

record—a collection of structured data elements. A group of records forms a table and/or a database. For example, a record might comprise data elements stored in fields such as: a name field, an address field, and a phone number field.

relationship—an association between two or more object and/or entities.

remove—to eliminate.

responsive—reacting to an influence and/or impetus.

said—a definite article for claimed elements.

sending—to convey.

start-time—a time stamp indicative a beginning of a time interval.

stop-time—a time stamp indicative an ending of a time interval.

store—to copy to a memory device.

substantially—to a great extent or degree.

system—a collection of mechanisms, devices, data, and/or instructions, the collection designed to perform one or more specific functions.

table—data arranged in physical and/or logical rows and columns.

tag—a device comprising a radio frequency identification transmitter.

the—a definite article that, when used in claim language, refers to an interaction of one or more claimed elements with something in an environment associated with a particular claim.

temporally adjacent—directly before in a time ordering.

temporal join query—one or more machine-readable instructions adapted to retrieve records from two or more tables associated with a predetermined time.

temporal slicing query—one or more machine-readable instructions adapted to retrieve information associated with a predetermined time interval.

temporal snapshot query—one or more machine-readable instructions adapted to retrieve information associated with a predetermined time.

time interval—a period of time between two instants.

timestamp—a quantitative representation of a time associated with an event.

transaction—a legal, intangible, tangible, and/or physical exchange or transfer of goods and/or rights.

transmit—to convey (force or energy) from one part of a mechanism to another.

via—by way of and/or utilizing.

DETAILED DESCRIPTION

Certain exemplary embodiments comprise a database table comprising a plurality of records, each of the plurality of records comprising an identification of an object, and/or an identification of a particular location of the object, each particular location of the object automatically determined responsive to automatically generatable, automatically receivable, radio frequency identification information.

Radio Frequency IDentification (RFID) technology can be utilized in an automatic identification method, which can comprise storing and/or remotely retrieving data using devices called RFID tags or transponders. An RFID tag can be comprised in an object that can be attached to, and/or incorporated into, a container, product, animal, and/or person, etc. RFID tags can comprise antennas adapted to receive and/or respond to radio-frequency queries from an RFID transceiver. Passive tags can be adapted to respond to radio frequency queries and might not comprise an internal power source. Active tags can comprise a power source and can be adapted to transmit information periodically, aperiodically, and/or responsive to a query, etc.

An RFID system can comprise tags, tag readers, edge servers, middleware, and/or application software, etc. An RFID system can be adapted to enable data to be transmitted by an RFID tag, which can be read by an RFID reader and processed. Data transmitted by the tag can provide identification information, location information, and/or other specific information about a particular tagged product. Specific information can comprise information regarding price, color, owner, manufacturing date, transaction date, transaction type, status of ownership, containment, and/or date of purchase, etc.

An RFID tag can comprise a transponder with a digital memory chip that can be given a unique electronic product code. A reader can comprise an antenna packaged with a transceiver and/or decoder. The reader can be adapted to emit a signal activating the RFID tag so the reader can read and/or write data to it. When an RFID tag passes through an electromagnetic zone associated with the reader, the tag can be adapted to detect an activation signal generated by the reader. The reader can be adapted to decode data encoded in the tag's integrated circuit (silicon chip) and/or transmitted by the tag and the obtained data can be passed to an information device for processing.

Certain exemplary embodiments relate to temporal data management methods of RFID (Radio Frequency Identification) data. Exemplary methods can be related to a history-oriented representation of RFID data, temporal data modeling of RFID data, implementation of temporal data modeling, physical data aggregation, semantic filtering, and/or complex temporal queries of RFID data, etc. Exemplary methods can analyze dynamic temporal characteristics of RFID data. A temporal data model can be formalized with dynamic relationships, which can provide a means of modeling and/or representing RFID data. Such a model can be useful in defining tables and/or providing a user with tools to generate complex queries for tracking and/or monitoring.

RFID technology can use radiofrequency waves to transfer data between a reader and a tagged item. Data from RFID technology can be physically and/or logically linked. Each item can be numbered, identified, catalogued, and/or tracked, etc. RFID-based systems can generate relatively huge amounts of data, and the generated data can be dynamic in character. Observations from readers can comprise transactional and/or temporal data. Certain exemplary embodiments comprise a history-oriented temporal modeling of RFID data, via which a history of every object is modeled.

Certain exemplary embodiments can assume general temporal information, i.e., entities, attributes of entities, and/or relationships therebetween are dynamic. Since RFID data can have special characteristics, certain exemplary embodiments can comprise a temporal data model adapted to be used with RFID data and can comprise an extension to an ER data model.

Certain data models can support and/or facilitate complex queries such as tracking and/or monitoring. In certain exemplary embodiments, complex queries can be based on a history-oriented temporal data model.

Certain exemplary embodiments can relate to temporal data modeling of RFID data and/or history-oriented representation of RFID Data. A dynamic relationship ER model (DRER) can be utilized. The DRER model can be expressive and/or can be implemented via Static Entity Tables and/or Dynamic Relationship Tables. The DRER model can be adapted for use in providing tables and/or user interfaces adapted to generate queries. The user interfaces can be adapted to assist a user in generating queries adapted to track RFID objects and/or monitor RFID systems.

In an RFID System (e.g., an Electronic Product Code Information Service (EPCIS)), data can comprise raw observation data collected through RFID readers. Transactional data from RFID readers can be enriched with additional information, logic, and/or business semantics, e.g., containment relationship, location, and/or owner information. RFID system data can comprise high level data such as product level and/or business level data.

FIG. 1 is a schematic view of an exemplary embodiment of a system 1000. RFID Data can be dynamic, and an activity related to an object in an RFID system can be characterized as a change of status. Changes of status can comprise a containment relationship change (e.g., cases packed onto pallets—see activity 1 in FIG. 1); location change (e.g., a pallet checked out from a warehouse pallet—see activity 2 in FIG. 1), and/or ownership change (e.g., a pallet unloaded into a retail store—see activity 3 in in FIG. 1), etc. Change actions can be recorded based upon observations from readers. How long a particular status lasts can be determined based upon a plurality of observations from a plurality of readers. Certain exemplary embodiments comprise a data model that can represent history information.

An RFID system can be adapted to track objects and/or monitor a location of objects at a predetermined location, at a predetermined time, or both. In certain exemplary embodiments, a status change history of an object can be recorded (i.e., history-oriented data modeling). Certain exemplary embodiments can be based upon a Dynamic Relationship ER Model (DRER) adapted to be used with RFID data.

In an RFID system, entities can be defined as a reader, object (any object with an Electronic Product Code (EPC) tag), and/or location, etc. A location can represent a physical and/or logical location where an object is or was, and/or can be associated with an owner. There can be another high level entity transaction, which is business specific. Entities can be static, e.g., a product in a supply chain might not be altered. In certain exemplary embodiments, certain relationships can be dynamic, i.e., the relationship between any two entities might only last for a defined time interval.

DRER can be an extension of an ER model. In an ER model, entities and/or relationships might be assumed as current. Since entities can be static, and relationships can be dynamic, the ER model can be extended by inheriting all ER model semantics and/or adding one or more new dynamic relationships. A dynamic relationship is a relationship that can change with time. Two types of dynamic relationships can be defined between RFID entities: event-based dynamic relationships that generate events, and/or state-based dynamic relationships that generate state histories. For an event-based relationship, an attribute TIMESTAMP can be used to represent the occurrence timestamp of the event. For a state-based dynamic relationship, attributes TSTART and TEND can be used to represent the lifespan of a state.

Figure 2:
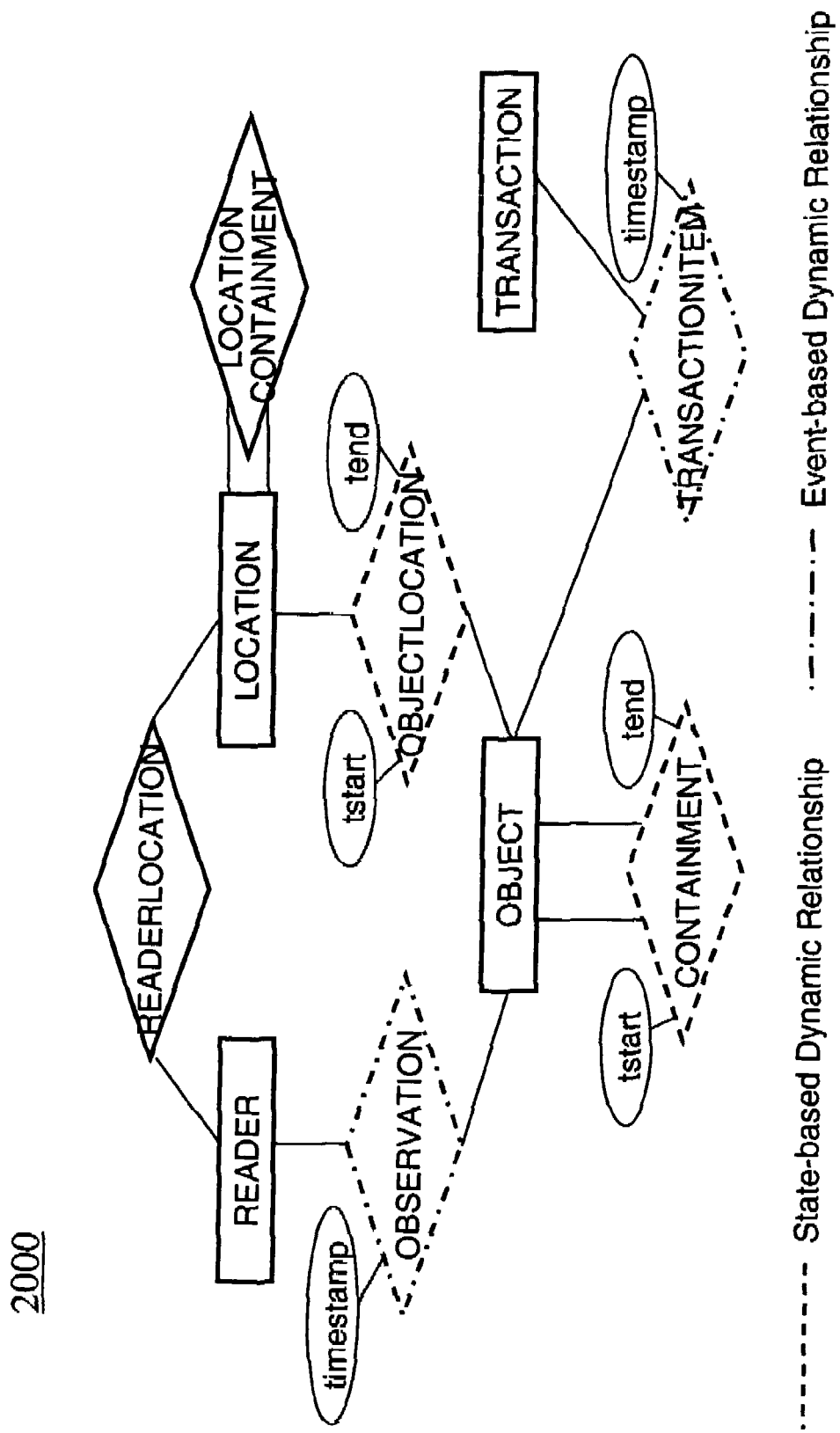
FIG. 2 is a diagram of a relationship model 2000.

FIG. 2 is a diagram of a relationship model 2000, which shows DRER modeling of RFID data (other attributes are ignored for illustrative purposes). DRER can be used with RFID data since entities can be static and relationships can be dynamic. Since DRER can explicitly use a temporal representation, i.e., history-oriented representation, certain exemplary embodiments comprise temporal query support such as one or more user interfaces adapted to generate one or more queries.

The DRER model can be implemented by mapping entities and/or relationships into tables. Static entities and/or static relationships can be mapped as static tables. A state-based dynamic relationship can be mapped as a table comprising keys from both entities, an interval [TSTART, TEND] to represent the lifespan in which the relationship exists. An event-based dynamic relationship can be mapped as a table consisting of keys from both entities, and/or an associated timestamp.

Based on the DRER model, RFID data can be mapped in one or more of the following tables:

Entity Tables:
  READER(reader_epc, name, description): a READER table can be adapted to comprise an EPC, name, and/or description of a reader. For additional attributes, the reader table can be extended with an extension table READER_EXT(epc, property, value).
  OBJECT(epc, name, description): an OBJECT table can be adapted to comprise the EPC, name, and/or description of an EPC-tagged object. The OBJECT table might be optional, and/or can comprise more attributes via an extension with a table such as OBJECT_EXT(epc, property, value).
  LOCATION(location_id, name, owner): a location table can be adapted to define symbolic business locations used for tracking, including id, name, and/or owner of a location. A location can be a warehouse, store shelf, and/or a route between another two locations, etc.
  LOCATION_EXT(location_id, property, value): a location extension table can be adapted to comprise position information, e.g., positions represented by properties position_x, position_y, and/or position_z, etc.
  TRANSACTION(transaction_id, transaction_type): a transaction table can be adapted to comprise business specific transaction data. For example, a transaction can be represented as a record of transaction id and/or a transaction type.
  TRANSACTION_EXT(transaction_id, property, value): a transaction extension table can be adapted to extend the transaction table.

Static Relationship Tables:
  READERLOCATION(reader_epc, location_id): a reader location table can be adapted to comprise a location of a reader, EPC of the reader, and/or a location id, etc.
  LOCATIONCONTAINMENT(location_id, parent_location_id): a location containment table can be adapted to comprise a containment relationship among locations. For example, a warehouse may comprise containments such as a loading zone and/or a departure exit.

Event-based Dynamic Relationship Tables:
  OBSERVATION(reader_epc, value, timestamp): an observation table records can be adapted to comprise raw reading data generated from readers, which can comprise an EPC of a reader, reading value, and/or a reading timestamp, etc.
  TRANSACTIONITEM(transaction_id, epc, timestamp): a transaction item table can be adapted to comprise information related to a transaction. The information can comprise a transaction id, EPC of the object in the transaction, and/or a timestamp related to the transaction.

State-based Dynamic Relationship Tables:
  CONTAINMENT(epc, parent_epc, TSTART, TEND): a containment table can be adapted to comprise information regarding in what period [TSTART, TEND] an object (identified by its EPC) is contained in a parent object (identified by parent EPC).
  OBJECTLOCATION(epc, location_id, TSTART, TEND): an object location table can be adapted to comprise a location history of each object, which can comprise an object's EPC, location id, and/or the period [TSTART, TEND] during which the object stays in a particular location, etc.

Figure 3:
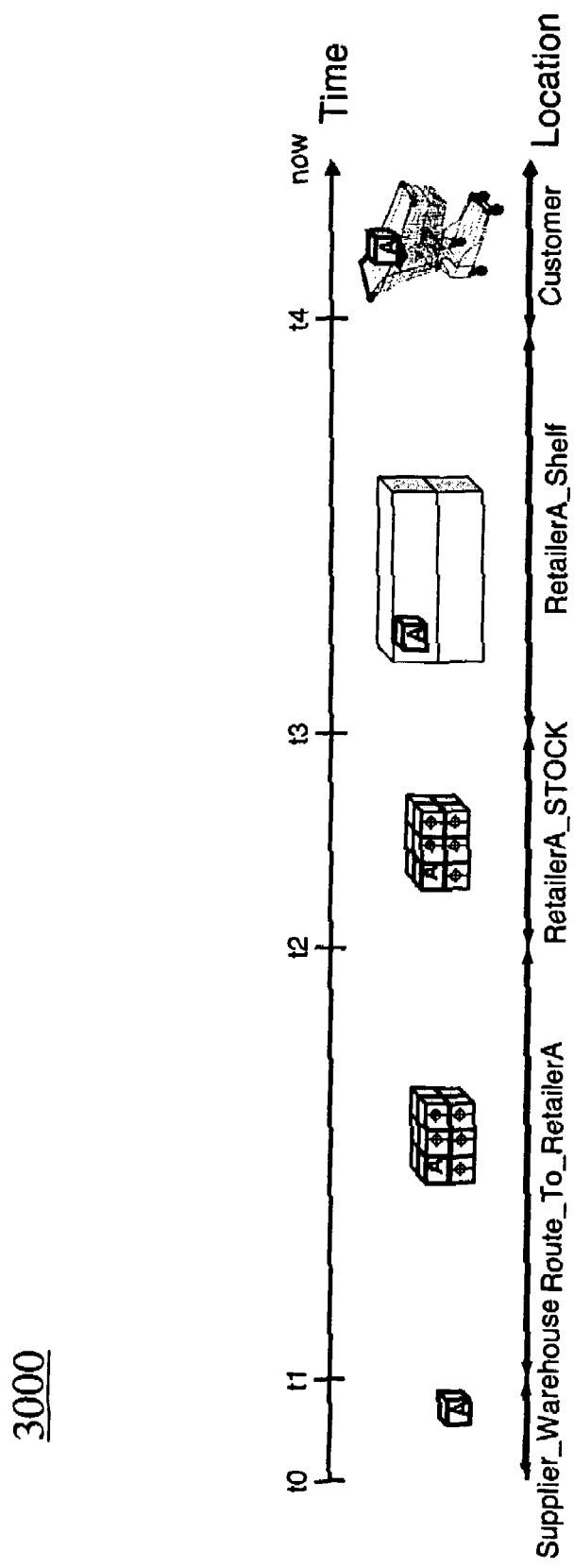
FIG. 3 is a diagram 3000 of a history of an object.

FIG. 3 is a diagram 3000 of a history of an object, which can illustrate how an object changes locations and/or containers over time. For example, from t1 to t2, Object A was on the location Route_To_RetailerA, and from t2 to t3, Object A was stored in location RetailerA_STOCK. For an exemplary containment relationship, object A was on a pallet from t1 to t3. Information regarding changes can be stored in one or more tables such as an OBJECTLOCATION table and/or a CONTAINMENT table.

Queries on RFID data can relate to and/or request historical information. The Dynamic Relationship ER Model, and/or implemented Static Entities Tables, Static Relationship Tables and/or Dynamic Relationship Tables can support be queried for temporal information. For example, an object-tracking query can be adapted to retrieve a history of one or more locations of an object during a particular time interval. An inventory monitoring query can be adapted to retrieve a current snapshot aggregate at a location. A containment relationship query can be adapted to retrieve historical information regarding containments associated with a particular object over time. Each query can be related to time. The DRER data model can be adapted to support queries for temporal information. RFID queries can be classified in categories according to temporal characteristics:

History Queries are queries which can retrieve a compete history of an object and/or relationship. For example, RFID Object Tracking, Missing RFID Object Detection, and/or RFID Object Supplying Time Inquiry, etc.;

Temporal Snapshot Queries are queries which can retrieve information at a snapshot in a history, for example, inventory monitoring queries that check a current snapshot at an inventory location and/or an RFID Object Snapshot State Identification;

Temporal Slicing Queries are queries which can retrieve information between two timestamps. For example, an RFID Object Interval State Identification and/or request for all items sold in last week;

Temporal Aggregate Queries are queries which can aggregate values according to time. For example, an RFID Data Aggregation and/or request for the top five weeks for sales during the past year.

Temporal Join Queries are queries that join the histories of two dynamic RFID relationships. These can comprise an RFID Object Connected States Identification.

Containment Queries are queries adapted to find containment relationships between objects. Certain containment queries can be recursive.

Constraint Queries are queries adapted to check a consistency of RFID data semantics. These include RFID Object Trace Monitoring.

Certain queries can be based upon one or more relationships derived from the DRER model, by specifying temporal constraints and/or temporal aggregates.

Updates can be classified as follows:

Insertion of a new event—a new record can be inserted in a corresponding event table with a current timestamp.

Insertion of a new state—a new state record can be created (e.g., a new record in an OBJECTLOCATION table), which can comprise a starting timestamp TSTART as a current timestamp, and an ending timestamp TEND.

Deletion of a state—a state has ended, which can comprise changing the ending timestamp TEND to a value of the current timestamp.

Update of a state—a state is changed, which can comprise a deletion of information from a table followed by an insertion of information in the table and/or another table.

When a parent container object is updated with a location change, locations of object contained therein can be updated recursively.

In an RFID System (i.e. EPCIS), data can comprise raw observation data collected through readers (such as RFID readers). Observation data can be filtered and/or aggregated as semantic business data, which can comprise relationships such as containment relationships, locations, and/or owner information, etc. Certain exemplary embodiments can comprise high level data such as product level and/or business data.

RFID data can change over time. Activities in an RFID system can comprise changes of state, which can comprise a change of location, change of containment relationship, and/or change of ownership, etc.

Figure 4:
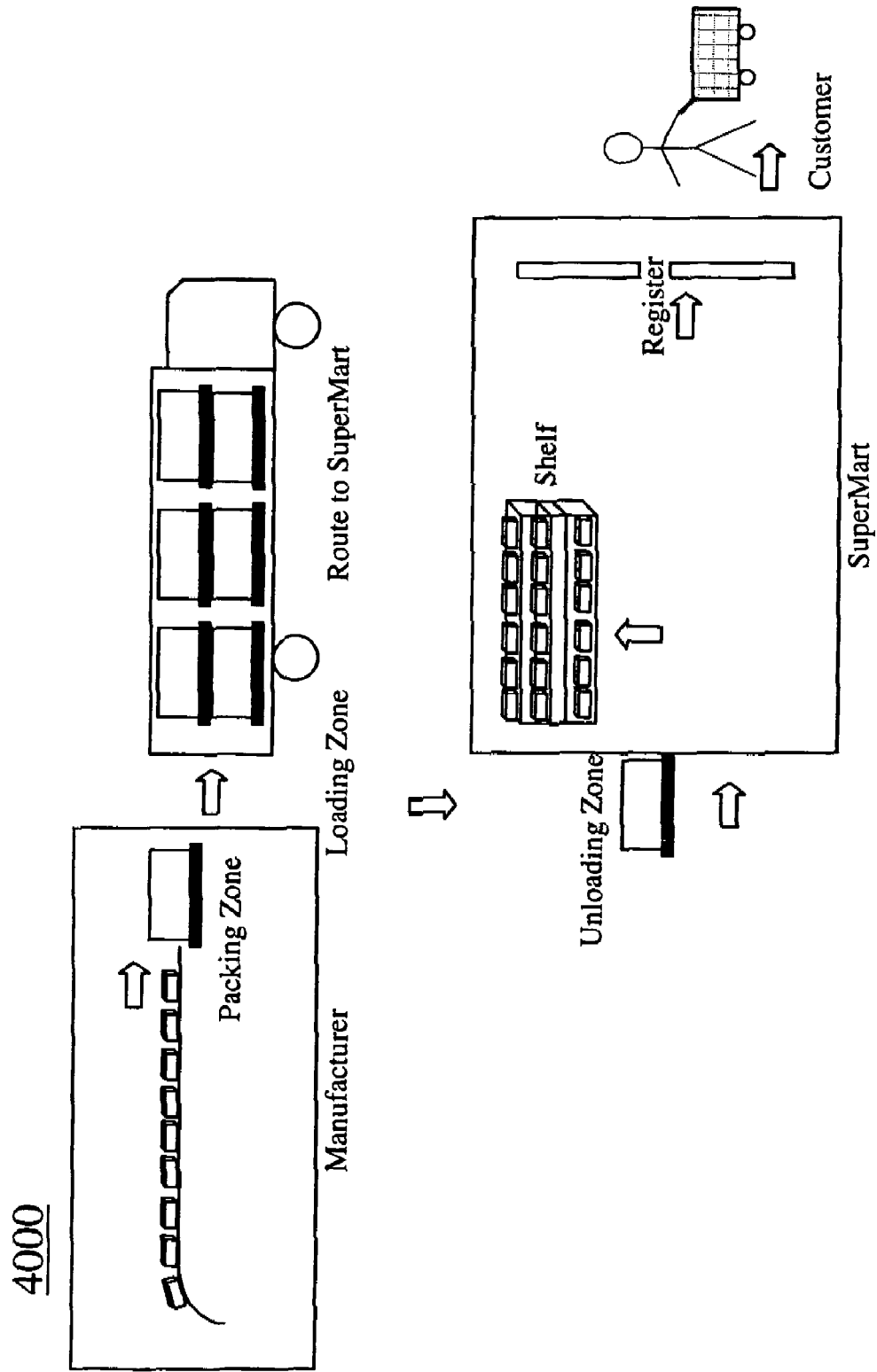
FIG. 4 is an schematic diagram of a system 4000.

FIG. 4 is a schematic diagram of a system 4000, which can comprise a set of locations. The set of locations can comprise a packing zone of the manufacturer, a loading zone, the route to the supermarket, an unloading zone, a shelf, and/or a register, etc. Locations of objects can be changed during a business process, and/or containment relationships can be changed when objects are packed, loaded, and/or unloaded, etc.

Figure 5:
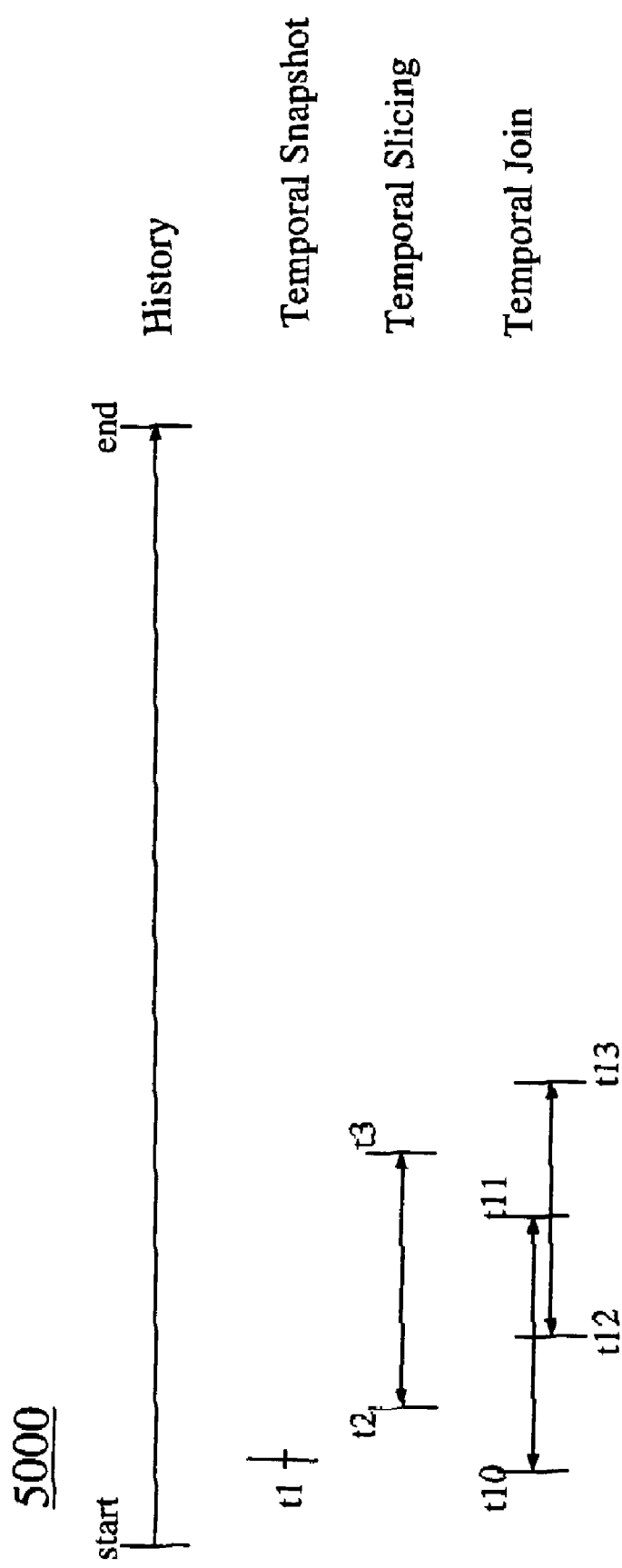
FIG. 5 is a time interval diagram 5000 associated with RFID queries.

FIG. 5 is a time interval diagram 5000 associated with RFID queries. Temporal constraints in an RFID query can comprise a history, a point of time (temporal snapshot), and/or an interval of time (temporal slicing), etc. Temporal constraints can be complex, for example, two intervals intersecting together, i.e., temporal join queries. Another complex case can be when a query is an aggregate on certain timestamps and/or intervals, i.e., temporal aggregate. Certain queries can be interleaved to form more complex queries.

Certain exemplary embodimetns can comprise RFID data tracking and/or monitoring. RFID data tracking can be adapted to track RFID objects, including missing objects. RFID Monitoring can be adapted to monitor states of RFID objects and/or an RFID system.

Figure 6:
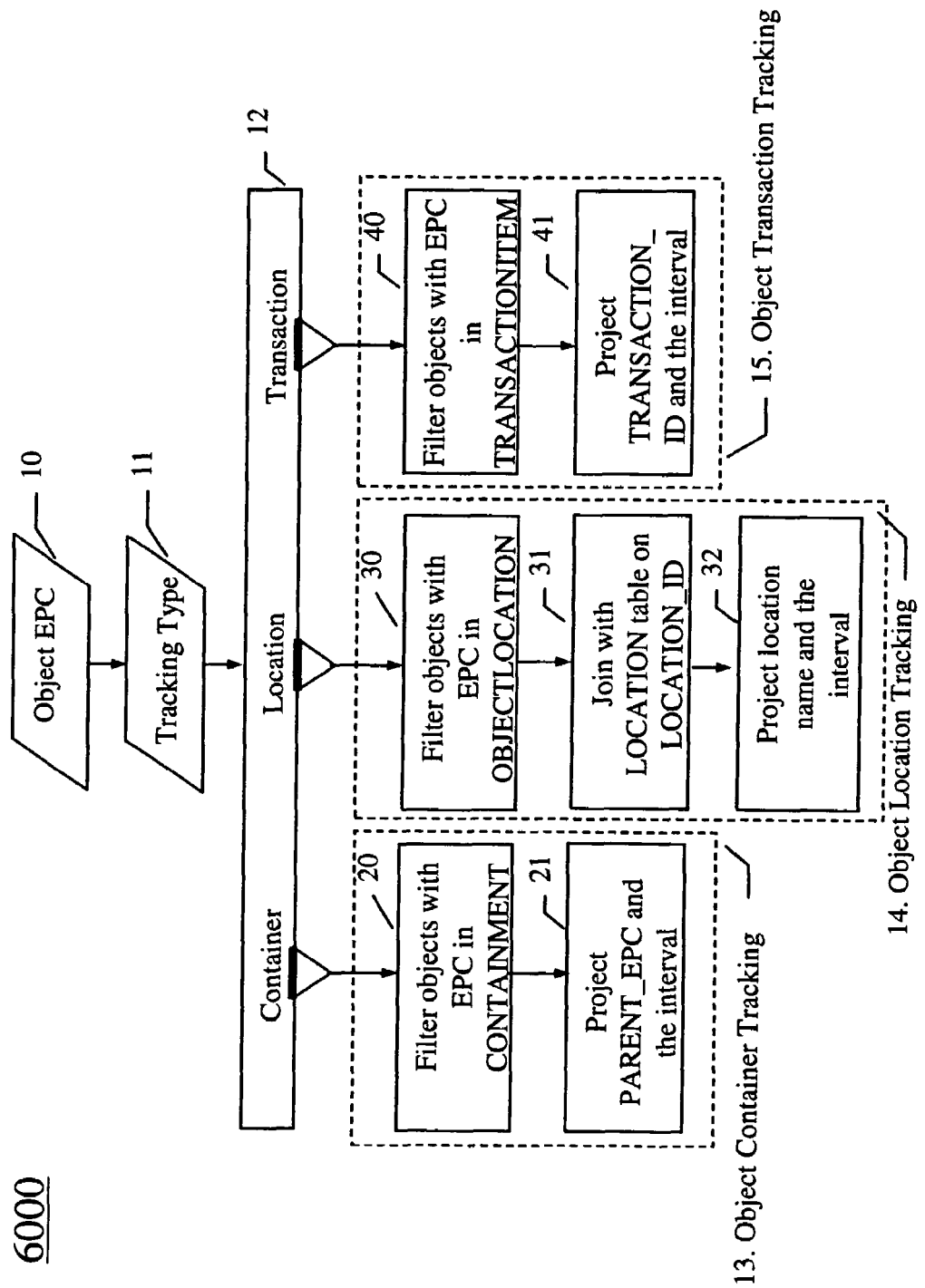
FIG. 6 is a flowchart of an exemplary embodiment of a method 6000 for RFID object tracking.

FIG. 6 is a method 6000 for RFID object tracking, which can be used to track the history of an object's locations, containers, and/or transactions. At activity 10 and 11, an EPC of the object to be tracked and a tracking type can be respectively input. At activity 12, tracking types can be defined such as container, location, and/or transaction, etc., which lead to RFID object container tracking (activity 13), RFID object location tracking (activity 14), and RFID object transaction tracking (activity 15) respectively.

For RFID object container tracking, at activity 20, records in a CONTAINMENT table can be filtered out by the EPC of the object. At activity 21, a PARENTEPC value and an associated interval can be projected, which can comprise a history of containers associated with the object.

For RFID object location tracking, at activity 30, records in an OBJECTLOCATION table can be filtered by the EPC of the object, and then can be joined with table LOCATION based upon a LOCATION_ID value at activity 31. At activity 32, location name and the interval can be projected, which can comprise a location history of the object.

For RFID object transaction tracking, at activity 40, records in a TRANSACTIONITEM table can be filtered based upon the EPC of the object. At activity 32, a transaction identifier (a value that can be denoted as "transaction_id") and an associated time interval can be projected, which can comprise a transaction history of the object.

Figure 7:
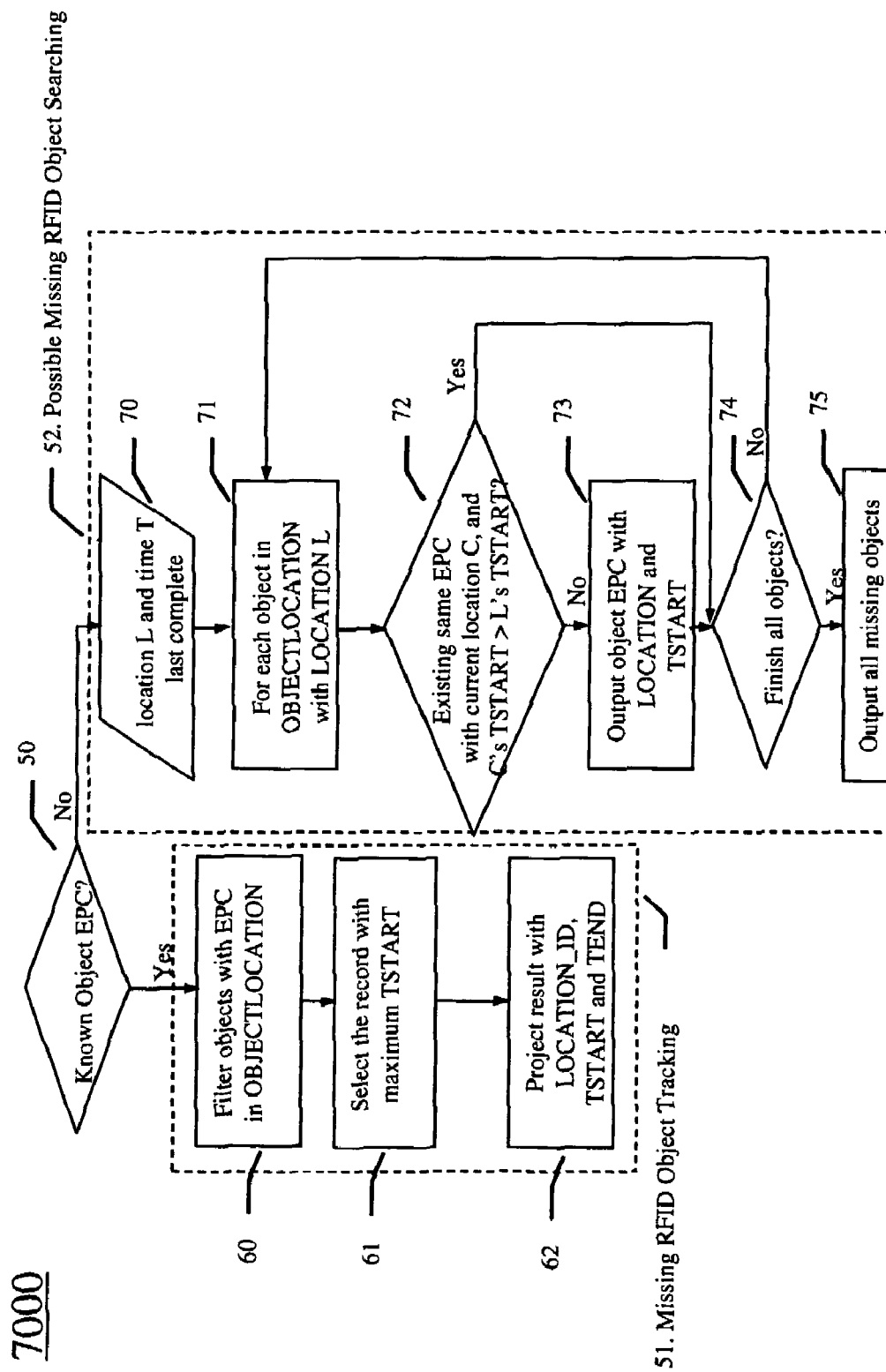
FIG. 7 is a flowchart of an exemplary embodiment of a method 7000 for searching for missing RFID objects.

FIG. 7 is a method 7000 for searching for missing RFID objects. Certain exemplary embodiments can comprise activity 51, which can comprise a Missing RFID Object Tracking procedure adapted to locate where and/or when an object is lost, given an EPC of the lost object. A determination can be made that the object appeared at previous locations, but not at a current location. At activity 50, a determination can be made that the EPC of the object is known. At activity 60, objects can be filtered based upon data comprised in an OBJECTLOCATION table using the EPC of the missing object. At activity 61, a record with a maximum TSTART can be selected, which can be a most recent timestamp when the lost object was observed. At activity 62, a location identifier associated with the object (a parameter that can be denoted "location_id") and/or an associated timestamp can be projected, which can be adapted to identify when the object was lost and/or a last known location.

Certain exemplary embodiments can comprise an activity 52, which can comprise a Possible Missing RFID Object Searching procedure adapted to identify a missing object at a certain location C, knowing that at a previous location L and a previous timestamp T, all objects were complete. Certain exemplary embodiments can be adapted to compare two sets of objects between location C and location L. At activity 70, the location L and the time T (when objects are complete) can be given. At activity 71, a loop can be executed to search in an OBJECTLOCATION table for each object whose interval comprises time T. At activity 72, a search can be made to determine, for each object at location L with an interval covering timestamp T, if there is a corresponding object in OBJECTLOCATION with a same EPC, location C, and TSTART that is more recent than T. If so, then the object can be characterized as not missing, or can be characterized as missing otherwise. At activity 73, information regarding missing objects can be output. At activity 74, a determination can be made to ascertain if a search has been made for information regarding objects considered, otherwise activities can be repeated beginning at activity 72. At activity 75, an output can list and/or define all missing objects.

Figure 8:
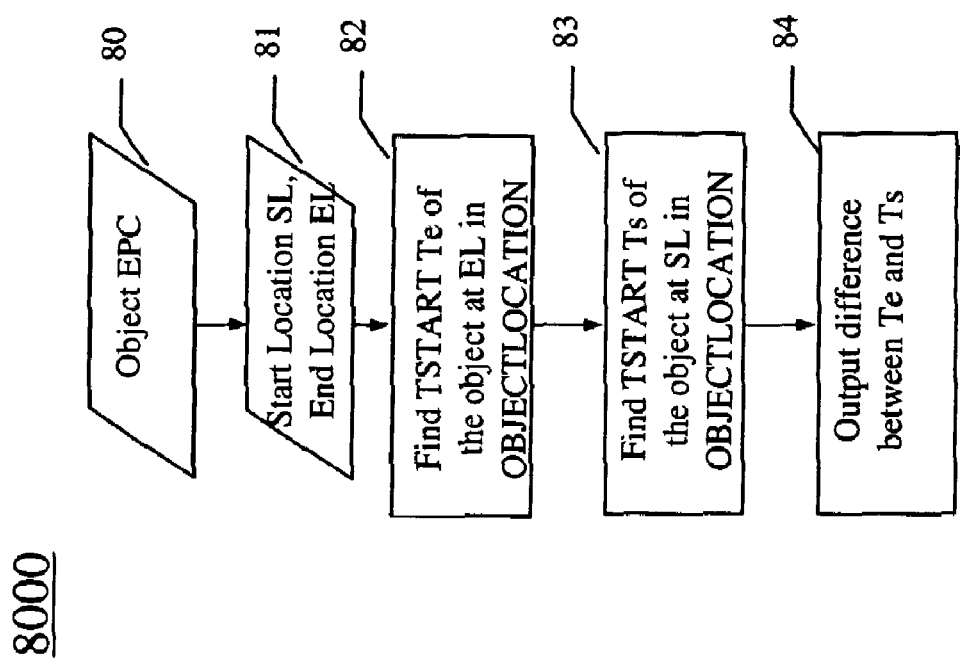
FIG. 8 is a flowchart of an exemplary embodiment of a method 8000 for determining a time interval associated with motion of an object.

FIG. 8 is a flowchart of an exemplary embodiment of a method 8000 for determining a time interval associated with motion of an object, which can be adapted to determine how long it takes to supply an RFID object, from a start location SL to a target location EL. At activity 80, an EPC of the object can be given. At activity 81, start location SL and end location EL can be provided. At activity 82, a search can be performed, for a TSTART value Te of the object at location EL, in an OBJECTLOCATION table. At activity 83, a search can be performed, for a TSTART value Ts of the object at location SL, in the OBJECTLOCATION table. At activity 84, an output can be generated regarding a difference between Te and Ts, i.e., an interval of time to move the object from location SL to EL.

Figure 9:
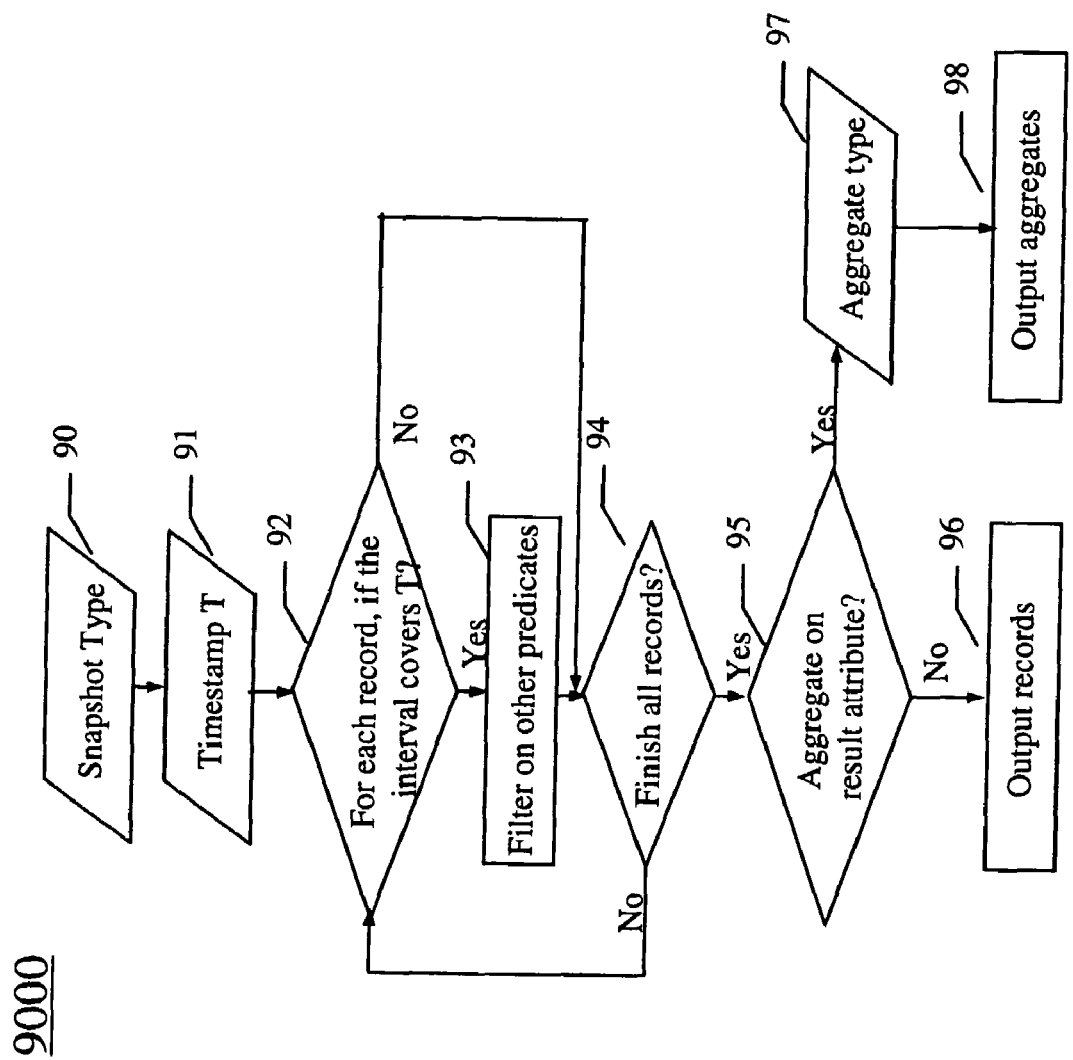
FIG. 9 is a flowchart of an exemplary embodiment of a method 9000 for RFID Object Snapshot State Identification.

FIG. 9 is a flowchart of an exemplary embodiment of a method 9000 for RFID Object Snapshot State Identification, which can be adapted to retrieve RFID objects' states at a certain timestamp responsive to temporal snapshot queries. At activity 90, a snapshot type can be provided, i.e., which relationship a snapshot is taken on. The snapshot can be a CONTAINMENT Temporal Snapshot, OBJECTLOCATION Temporal Snapshot, OBSERVATION Temporal Snapshot, and/or TRANSACTION Temporal Snapshot, etc. At activity 91, a snapshot time T can be provided. At activity 92, each record in a corresponding relationship can checked on an interval to determine if the interval comprises the snapshot timestamp T. At activity 93, data can be filtered on other predicates, if any. At activity 94, a determination can be made regarding whether all desired records have been checked. If no aggregate is checked at activity 95, then results can be output at activity 96. Otherwise, records can be aggregated according to an aggregate type provided at activity 97. An aggregate type can be a sum, count, average, and/or variations thereof, etc. At activity 98, an output can be provided of an aggregated result.

Figure 10:
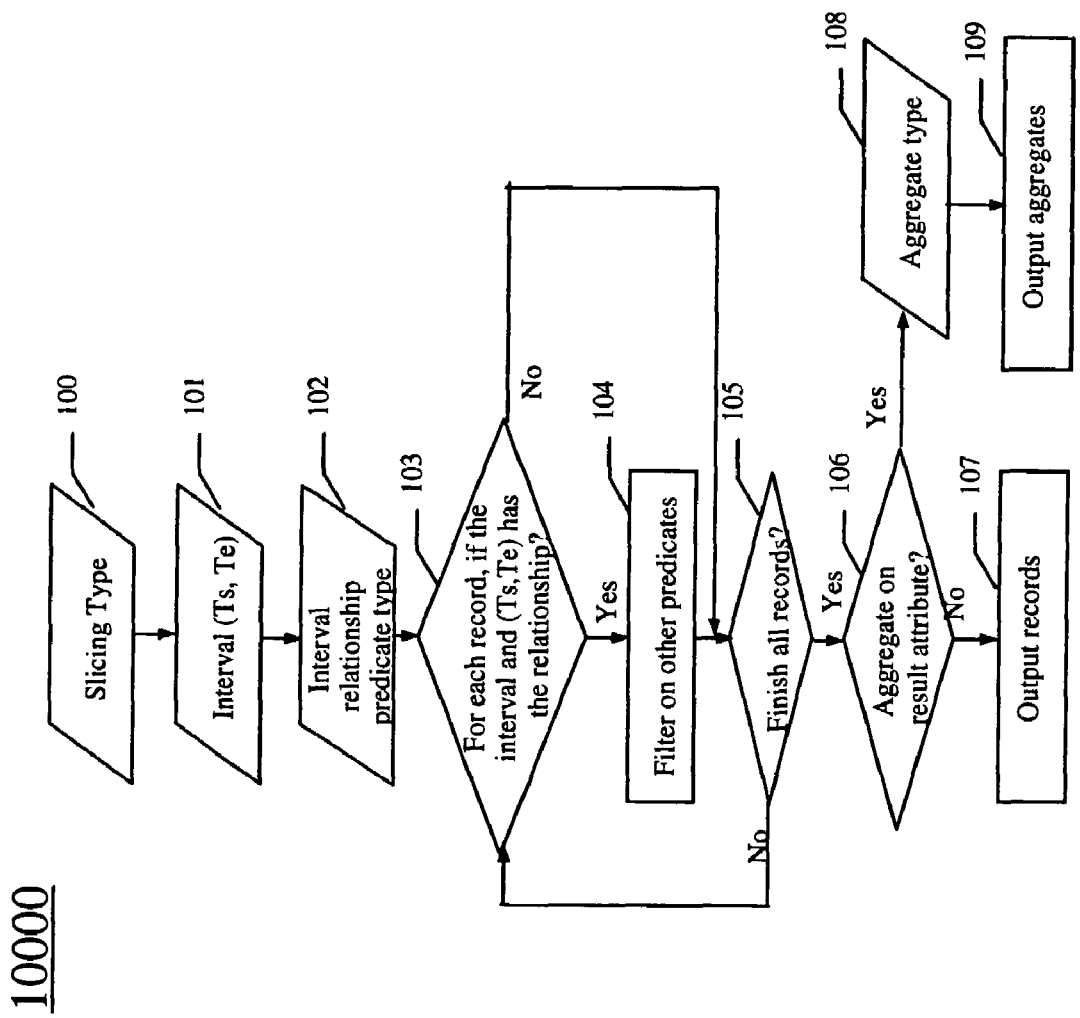
FIG. 10 is a flowchart of an exemplary embodiment of a method 10000 for a temporal slicing query.

FIG. 10 is a flowchart of an exemplary embodiment of a method 10000 for a temporal slicing query. The query can comprise an RFID Object Interval State Identification, which can be adapted to retrieve one or more states of RFID objects over an interval. At activity 100, a slicing type can be provided, i.e., which the temporal slicing query can be based upon. Temporal slicing can be CONTAINMENT Temporal Slicing, OBJECTLOCATION Temporal Slicing, OBSERVATION Temporal Slicing, and/or TRANSACTION Temporal Slicing, etc. At activity 101, a slicing interval (Ts, Te) can be provided. At activity 102, an interval relationship predicate type can be provided. Predicates can comprise overlaps, precedes, contains, equals, and/or meets, etc., which can be adapted to check if a corresponding containment relationship is satisfied between two intervals. At activity 103, each record in the corresponding relationship can be checked on a respective interval with the provided slicing interval (Ts, Te), to see if the two intervals are comprised in the defined containment relationship. At activity 104, data can be filtered on other predicates, if any. At activity 105, a determination can be made regarding whether all desired records have been checked. If no aggregate is checked at activity 106, then results can be output at activity 107. Otherwise, records can be aggregated according to an aggregate type provided at activity 108. The aggregate type can be a sum, count, average, and/or variations thereof, etc. At activity 109, aggregated results can be output.

Figure 11:
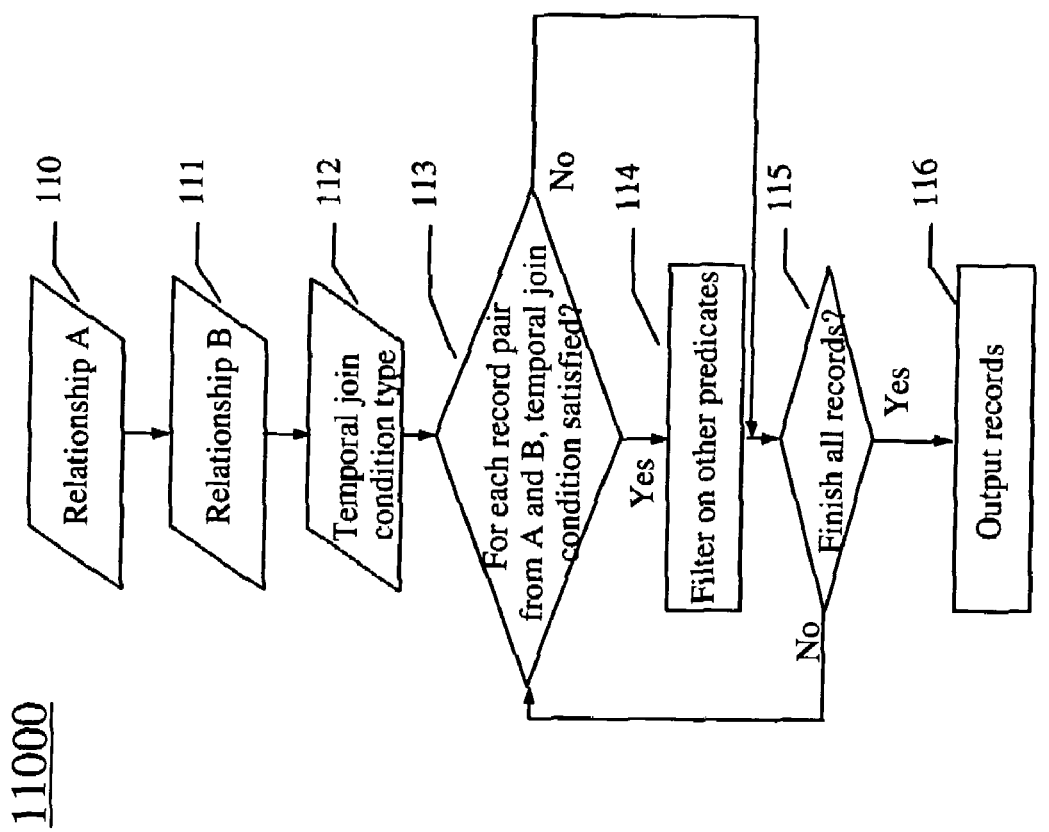
FIG. 11 is a flowchart of an exemplary embodiment of a method 11000 for joining two temporal RFID relationships.

FIG. 11 is a flowchart of an exemplary embodiment of a method 11000 for joining two temporal RFID relationships. An RFID Object Connected States Identification procedure can be adapted to retrieve one or more states of RFID objects responsive to a connected relationship. Certain exemplary embodiments can be adapted to search for information regarding a container associated with an object when the object was at a location A between times T1 and T2. Certain exemplary embodiments can be adapted to join two temporal RFID relationships (or a relationship itself) on temporal attributes. At activity 110 and 111, two relationships to be joined can be specified. At activity 112, a temporal join condition type can be specified, which can be overlaps, precedes, contains, equals, and/or meets, etc. At activity 113, a temporal join condition can be checked; if the condition is true, other join conditions can be checked at activity 114. At activity 115, a determination can be made to ascertain if all desired records have been searched and/or joined. If not, activities can be repeated beginning at activity 113. If all records have been searched and/or joined, results can be output at activity 116.

An RFID Data Aggregation procedure can be adapted to aggregate RFID data based upon certain attributes. The RFID Data Aggregation can be performed via temporal aggregating on temporal constraints, e.g., aggregating on a temporal snapshot and/or temporal slicing. Common aggregates can comprise a sum, count, and/or average, etc. In an exemplary embodiment, the RFID Data Aggregation can be adapted to determine all observations made at location A at noon, on a date of 15 Dec. 2004. Queries can be interleaved with RFID Object Snapshot State Identification and/or RFID Object Interval State Identification, in which an aggregate type is optional for aggregating based upon results obtained therefrom. Aggregate categories can comprise an RFID temporal snapshot aggregate and/or an RFID temporal slicing aggregate. The RFID temporal snapshot aggregate can be adapted to aggregate on RFID attributes at a temporal snapshot, as shown in FIG. 9, wherein at activity 95, a determination can be made to choose to aggregate on a result. RFID temporal slicing aggregate can be adapted to aggregate on RFID attributes at a temporal slicing, as shown in FIG. 10, wherein at activity 106, a determination can be made to choose to aggregate on the result.

RFID containment queries can be queries that retrieve containment relationships between RFID objects. RFID containment queries can be interleaved with other temporal RFID queries. For example, an RFID Object Sibling Search can be adapted to find sibling objects of a container object. An RFID Object Ancestor Search can be adapted to find ancestor container objects of an object.

FIG. 12 is a flowchart of an exemplary embodiment of a method 12000 for an RFID Object Sibling Search (for container with EPC='pepc'). Method 12000 can comprise a recursive query in which a recursive view ALL_SUB can be defined, at activity S1, as a union of two queries (SA and SB). At activity SA, pairs (parentepc, epc) can be selected from a CONTAINMENT table with parentepc as 'pepc' and query results can be put into a view ALL_SUB. At activity SB, if there exists an EPC from ALL_SUB view that equals the parentepc in the CONTAINMENT table, then the corresponding parentepc from ALL_SUB view and epc from CONTAINMENT can be selected and/or put into the ALL_SUB view. This activity can be performed recursively until no further tuples are qualified. At activity S2 final results can be returned.

Figure 13:
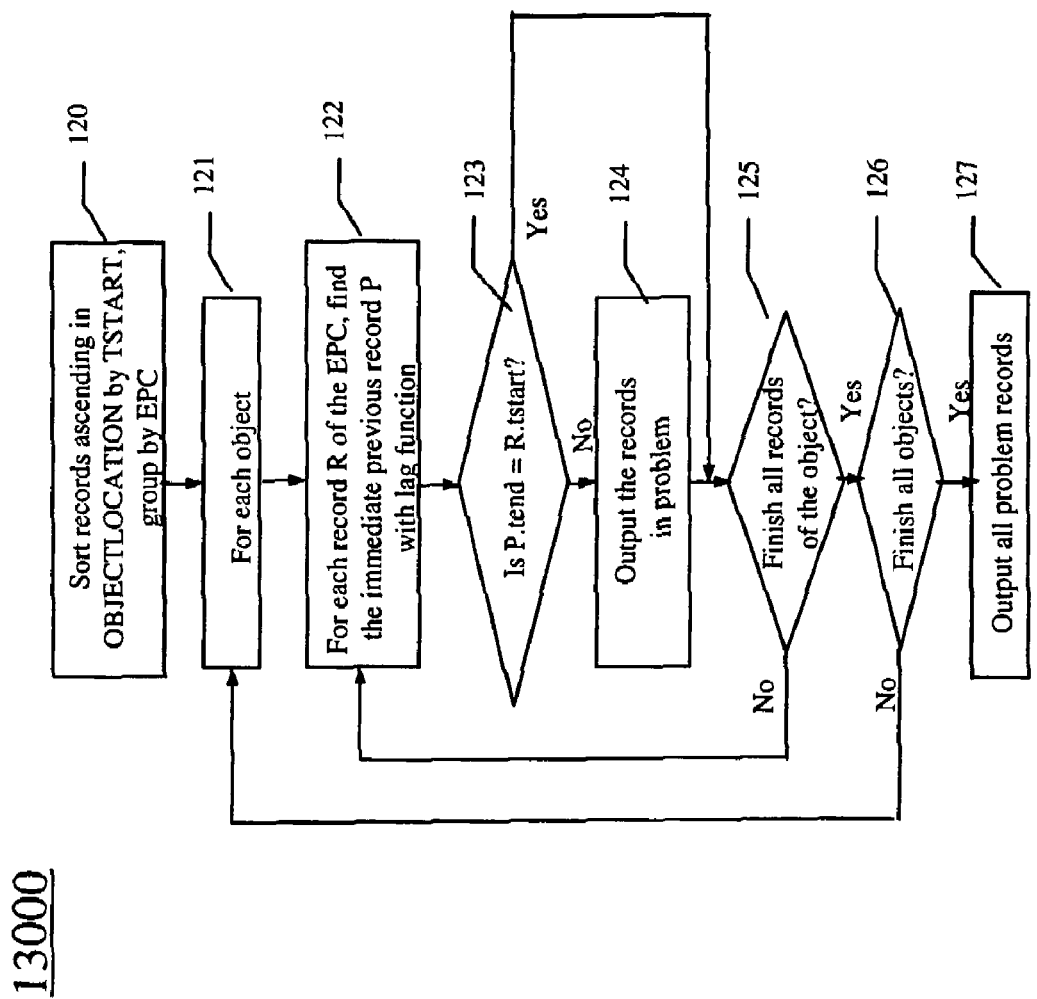
FIG. 13 is a flowchart of an exemplary embodiment of a method 13000 for RFID Object Trace Monitoring.

FIG. 13 is a flowchart of an exemplary embodiment of a method 13000 for RFID Object Trace Monitoring, which can be adapted to monitor if an object's trace is continuous. RFID Object Trace Monitoring can be performed via a Continuous History Constraint, i.e., an object's history should be continuous such that the object should always belong to some location in the history. Records in a table OBJECTLOCATION can be sorted in ascending order, and/or grouped by object EPC at activity 120. At activity 121, a loop can be started on each object, by iterating on each sorted record of the object, such as a record C. An immediately previous record P can be found at activity 122 (previous record can be obtained, e.g., using the lag function in SQL). At activity 123, a determination can be made whether a TEND of previous record P is equal to a TSTART of the current record C. If so, the precedure can resume at activity 125. Otherwise, there can be a consistency problem for two records, for which information can be output at activity 124. At activity 125, a determination can be made to ascertain if all desired records of the object have been processed, otherwise method 13000 can be partially repeated beginning at activity 122. At activity 125, a determination can be made to ascertain if all desired objects have been processed. If all objects have been processed, any inconsistent records can be output. Otherwise, activities can be repeated beginning at activity 121 for another object.

Certain exemplary embodiments can be related to event management of RFID data, data management of RFID data, RFID data tracking and/or monitoring, and/or data integration of RFID data, etc. Certain exemplary embodiments can be adapted to study fundamental characteristics of RFID data, and/or can comprise an adaptable RFID data system architecture for general RFID systems. The architecture can comprise Primitive Event Managers for data capturing, filtering, and/or routing; RFID Data Managers for semantic data processing, modeling, querying, and/or decision-making; and/or RFID data integration Managers, etc. Certain exemplary embodiments can be adapted to provide a general architecture framework for building RFID applications.

In certain exemplary embodiments an RFID data architecture for RFID application can comprise performance characteristics comprising: i) an adaptable architecture that can be applied to different RFID applications and/or domains; ii) automatic data filtering and/or semantic data transformation; iii) data modeling that can support object tracking, monitoring, and/or decision support; and/or iv) interfaces to interact with business applications, etc. The architecture can comprise a Primitive Event Managers for data capturing, filtering and/or routing; RFID Data Manager for semantic data processing, data modeling, RFID object tracking and/or monitoring, and/or decision-making; and/or RFID data integration, etc. The architecture can be general, comprehensive, and/or can be adapted to provide a framework for building RFID data systems.

Certain exemplary embodiments can be based upon characteristics of RFID data, as described below.

Temporal and dynamic. In an RFID system, data can be temporal and/or associated with time, and/or the states of objects can change with time. Reader observations can be associated with timestamps when readings are made; a location of an object can change with time; containment relationships can change with time; and/or EPC-related transactions can also be associated with one or more timestamps.

Streaming and real-time. RFID data can be real-time data, which can be dynamically processed in real time.

Huge amount of data. RFID systems can generate an enormous amount of data, which can pose challenges on data processing and/or data management.

Identity of data. An electronic product code (EPC) can be unique so each object can be uniquely identified. Thus, RFID data can be helpful to track products and/or monitor systems.

Inaccuracy of data. Duplicate readings can be obtained from a single reader, multiple readings of a single EPC tag from different readers due to zone intersections, missing readings, and/or erroneous readings, etc. Such erroneous data can be filtered, such as via a semantic filtration.

Multi-dimensional data with hidden business logic. Basic RFID data collected can be observation data generated from readings. Raw data can comprise multi-dimensional data with implicit business logic, and/or can be converted to semantic business data according to one or more predefined business rules.

Integration. AN RFID system can be integrated with applications such as ERPs for inventory management, product tracking, product monitoring, and/or customer services, etc. AN RFID system can be adapted to provide interfaces to connect with other enterprises for exchange of product and/or object information.

AN RFID data management system can be adapted to consider characteristics of RFID data, and/or can attempt to meet one or more objectives such as:

Efficient online stream processing. AN RFID data management system can be adapted to provide algorithms for data filtering before the data is stored.

Automated and adaptable event management. Certain exemplary embodiments can be adapted to provide an event management system that can be easily customized for arbitrary RFID-based systems. An event management system can convert raw observation data into semantic business data, for which business rules can be specified via a language adapted to define one or more declarative events and/or constraints. Code written in the language can be adapted to automatically generate the application codes, database schemas, and/or transformation procedures to enrich data with business logic.

Expressive data model supporting complex queries. RFID data can be unique in a sense that objects can be uniquely identified, and/or objects can be dynamically changing and/or moving with time. AN RFID data model can be adapted to capture such characteristics, model data, and/or provide table structures that can be conducive to complex queries for product tracking, product monitoring, and/or business intelligence, etc.

Smart inferences on incomplete data and consistency checking. Since RFID readings can be incorrect due to duplicate readings, missing readings, and/or erroneous readings, data can be inferred and/or corrected, and/or the data can be checked periodically to find any inconsistency.

Open and adaptable architecture. AN RFID data management system can be integrated into existing business applications such as ERPs, WMS, etc., and/or standard-based interfaces can be provided for convenient integrations. The system can provide standard interfaces for data sharing among different enterprises and/or different RFID data management systems.

Figure 14:
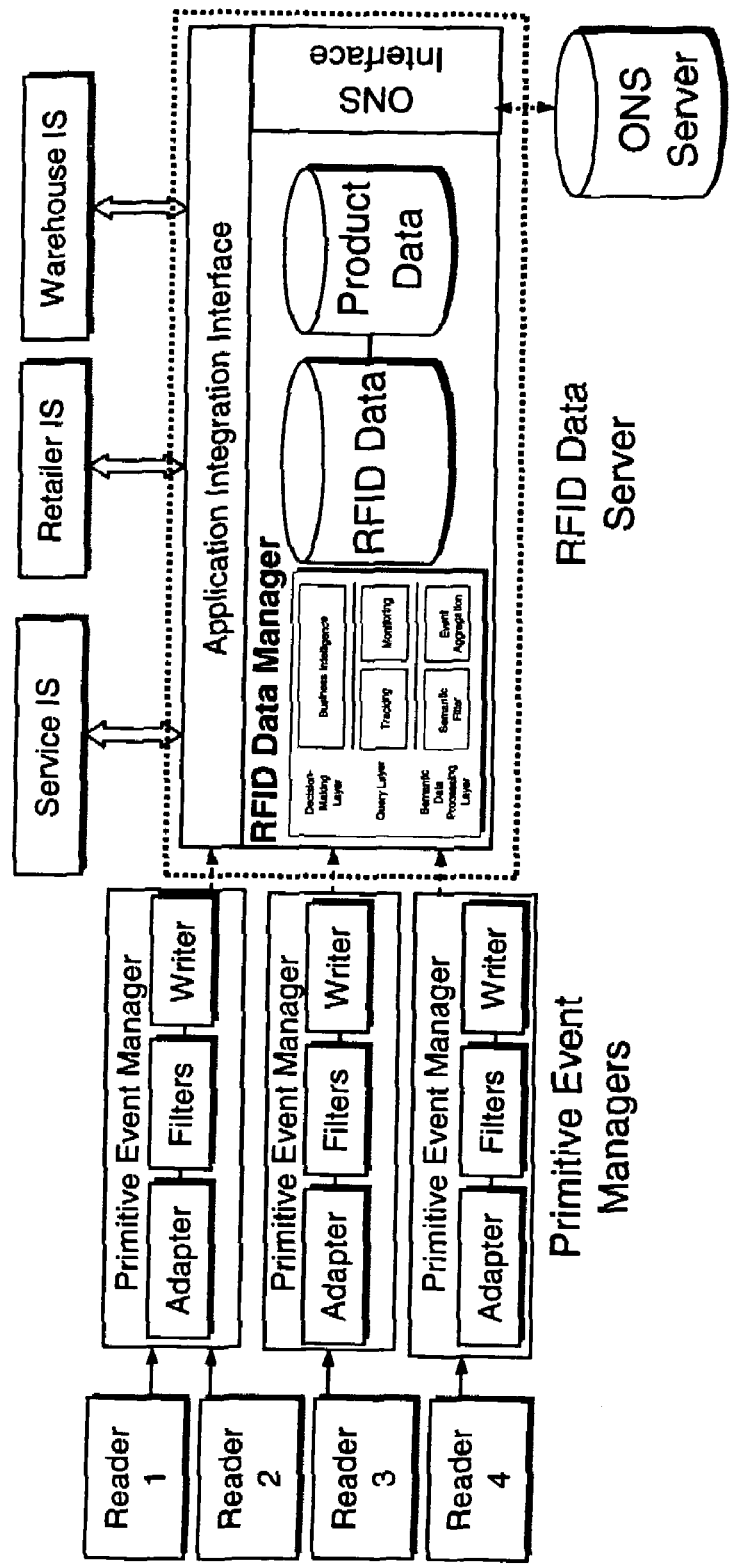
FIG. 14 is a schematic diagram of an exemplary RFID data architecture system 14000.

FIG. 14 is a schematic diagram of an exemplary RFID data architecture system 14000. System 14000 can comprise RFID Readers, Primitive Event Managers, and/or an RFID Data Server, etc. The RFID Data Server can comprise an RFID Data Manager, RFID Data Store, Product Data Store, and/or integration interfaces, etc. RFID Data Server can communicate other RFID Data Servers and/or enterprises through an Object Naming Service (ONS) Server.

Primitive Event Managers can be a front end of an RFID data architecture, which can dynamically receive data from readers, filter the data, and/or forward data to an RFID Data Server, etc. Primitive Event Managers can comprise a set of Event Managers, which can function in parallel at different clients. Each Event Manager can connect to multiple readers, and can be adapted to process data generated from a plurality of readers simultaneously. Event Managers can connect to the RFID Data Server locally and/or through networks. An Event Manager can comprise Reader Adapters, a set of Filters, and/or Writers, etc.

A Reader Adapter can be a software component adapted to communicate with RFID readers. The Reader Adapter can be adapted to provide an interface for RFID data systems to access data from readers. The reader adapter can send commands to a reader to control the reader, such as via defining a reading frequency and/or cycle delay time. The reader adapter can be adapted to receive data generated from reader readings.

A Filter can comprise a data filtering component to preliminarily screen, normalize, and/or filter data An Event Manager can comprise a set of filters that can function individually and/or form a pipeline to filter data according to a semantic order. Filters can be extensible and/or can be built and/or plugged. The filtering functions can comprise removing duplicate data from a reader, detecting one or more errors, and/or performing other functions according to the data characteristics, etc. Since a filter in an Event Manager might not have global information, more advanced semantic data filtering can be done at a Semantic Data Processing Layer in the RFID Data Manager.

A Writer component can be adapted to route data to different targets (i.e., RFID Data Server). The writer can format filtered data in a format of Physical Markup Language (PML), a language for RFID data exchange, and then send the filtered data as messages, streams, and/or other formats according to application protocols, such as Web Services, JMS, HTTP response, and/or TCP/IP data packets, etc.

Figure 15:
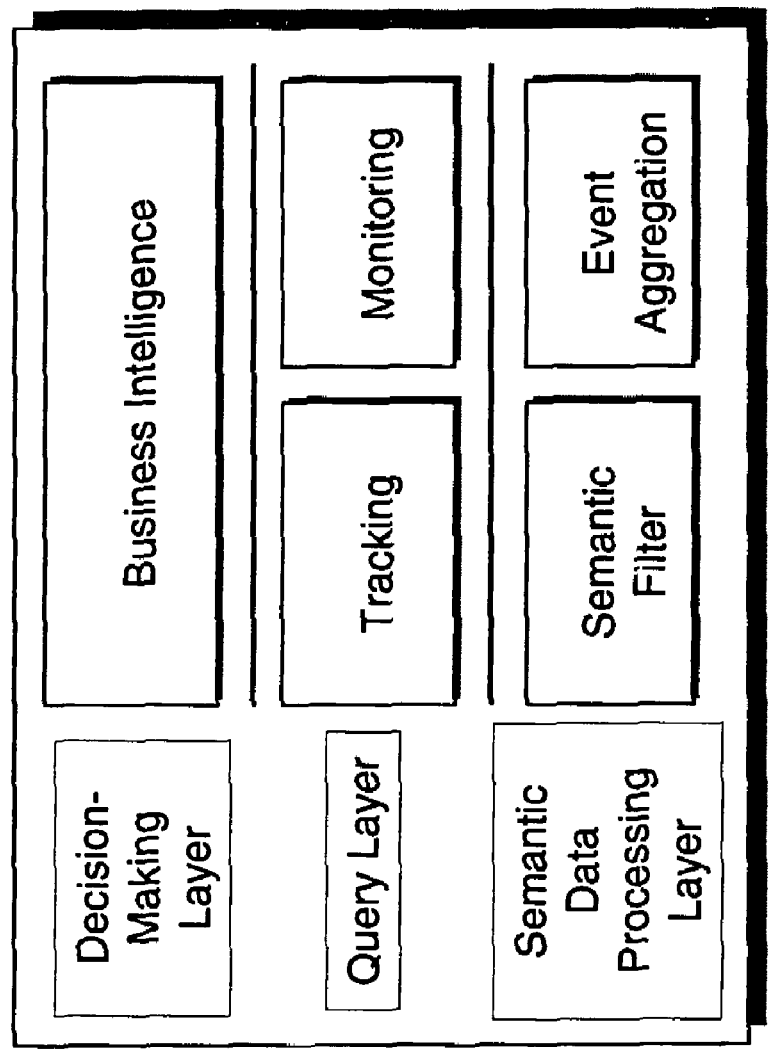
FIG. 15 is a schematic diagram of an RFID Data Manager 15000.

FIG. 15 is a schematic diagram of an RFID Data Manager 15000. RFID Data Manager 15000 can be a component of an RFID Data Server in an RFID Data Management System. RFID Data Manager 15000 can be adapted to provide data modeling, high level semantic data processing, event aggregation, RFID object tracking and/or monitoring, and/or decision-making support, etc. RFID Data Manager 15000 can comprise a Semantic Data Processing Layer, Query Layer, and/or Decision-Making Layer, etc.

The Semantic Data Processing Layer can be adapted to provide semantic filtering and/or event aggregation. Semantic data filtering can be adapted to filter data according to predefined constraints and/or rules with global and/or domain information. As an example, multiple readers can be adapted to scan product tags at different positions, and a possibility exists that two readers can both scan a same tag, thereby generating duplicate readings. The filter can be adapted to scan data within a certain time period (i.e., an interference interval) to find identical EPC values from different readers, and/or delete, hide, mark, and/or ignore duplicated readings.

Event aggregation can be adapted to convert EPC readings to events, and/or aggregate events as new events. For example, when a case is packed into a pallet, a reader can read an EPC associated with the case. This can generate two events: a location of the case has changed, and a container associated with the case has changed. As another example, when pallets are loaded into a truck to depart, a series of readings on pallets can be obtained, followed by a reading of an EPC associated with the truck. This sequence of events can be aggregated as an event of departure, and/or can lead to a change of location.

After processing, RFID observations can be transformed and/or enriched as semantic data via applying business logic. The business logic can be modeled based on a history-oriented data model. To automate such a transformation, a Declarative Event and Constraint Language can be defined.

The query layer can be adapted to define methods for RFID object tracking and/or RFID object monitoring. RFID object tracking can comprise determining missing objects. RFID Object Monitoring can be adapted to monitor states of RFID objects and/or an RFID system. In certain exemplary embodiments, queries can be formalized according to the temporal constraints.

A decision making layer can be adapted to provide business intelligence such as automatic shipping notice, low inventory alert, and/or trend analysis, etc.

An RFID Data Store can be adapted to provide table schemas implemented from a DRER data model. The RFID Data Store can be adapted to store RFID data for RFID object tracking and/or monitoring, and/or decision-making, etc. The RFID Data Store can be adapted to provide interfaces for data retrieval.

The RFID Data Store can be adapted to embody serial-level and/or product level information, such as product description, and/or product model, etc.

A Declarative Event and Constraint Language can be used to automate the process and/or configuration for adapting to various RFID applications. The Language can define a set of constraints and/or rules that define how data will be filtered, how events are triggered, how events are aggregated, and/or how events will update data in the system, etc. Based on such constraints and/or rules, a language parser can automatically generate procedures and/or application codes to semantically filter data, transform observations into business logic data, and/or update/insert corresponding records in RFID Data Store, etc.

Based on DRER data model, RFID object tracking and/or monitoring can be performed. Supported methods can comprise Universal RFID Object Tracking, Missing RFID Object Detection, RFID Object Supplying Time Inquiry, RFID Object Snapshot State Identification, RFID Object Interval State Identification, RFID Object Connected States Identification, RFID Data Aggregation, RFID Object Containment Examination, and/or RFID Object Trace Monitoring, etc.

The RFID Data Server can be integrated with business applications such as ERP, and/or WMS, etc. The RFID Data Server can be adapted to provide an application integration layer to integrate the system with other applications.

A plurality of RFID Data Servers among different enterprises can be adapted to share product and/or object information. The RFID Data Server can be adapted to provide another ONS integration layer that can be adapted to connect the RFID Data Server with an ONS Server. While the ONS Server can be adapted to use PML to exchange RFID data, a current PML standard might represent a standard for observation data. In certain exemplary embodiments, business logic data in the RFID Data Server might not have a standard format to exchange among business partners. Certain exemplary embodiments can comprise an XML-based representation of RFID data (X-RFID).

FIG. 16 is an XML procedure 16000. XML procedure 16000 can define a schema for publishing RFID data from the RFID data store, and/or exchanging them among partners. The schema can comprise a "RFID" element that comprises an "enterprise" child element with information of an owner of the RFID data, along with an "objects" child element which comprises a set of objects with its EPC, observation, and/or location history. XML procedure 16000 can also comprise child elements comprising "readers," "locations" and/or "transaction," which can correspond to reader, location, and/or transaction entities respectively. By publishing and/or transformation RFID data into an XML format, RFID data can be integrated and/or queried across different enterprises.

FIG. 17 is a table of relationships 17000. An exemplary system can comprise a series of processes, such as products packed onto pallets, pallets loaded onto a truck, the truck moved to a retailer store, pallets unloaded to the retailer store, products checked out at registers and/or sold to customers.

The exemplary system can comprise four readers, located at locations numbered one through four. The four readers can be adapted to collect data at each location, filter data, and/or send the data to an RFID Data Server. An RFID Data Manager can semantically filter the data, aggregate events, transform the data into business logic data, and/or store the data in tables, etc. The "x" symbols in table of relationships 17000 indicate table update locations.

When the data are automatically collected and/or organized in the DRER tables, RFID object tracking and/or monitoring can be expressed in tables referenced by table of relationships 17000, and/or business intelligence queries and/or alerts can be generated. Application and/or ONS integration interfaces can exchange and/or share data according to application requests.

Figure 18:
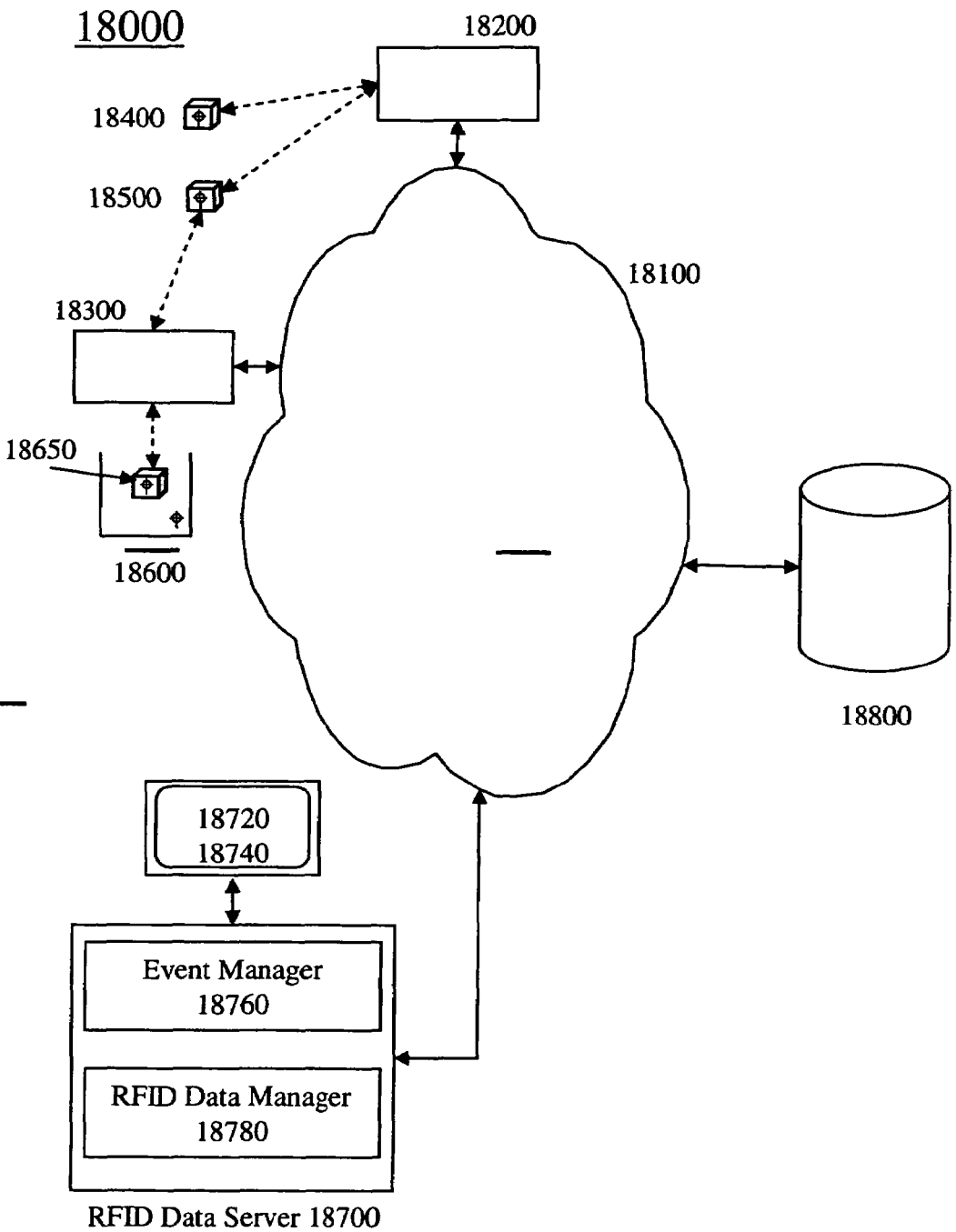
FIG. 18 is a schematic diagram of a system 18000.

FIG. 18 is a schematic diagram of an exemplary embodiment of a system 18000, which can comprise a network 18100. System 18000 can comprise a first RFID reader 18200 and a second RFID reader 18300. Each of first RFID reader 18200 and second RFID reader 18300 can be communicatively coupled to network 18100. RFID reader 18200 and second RFID reader 18300 can be active readers, passive readers, and/or any combination thereof.

RFID reader 18200 can be adapted to read RFID information from an object 18400 and/or an object 18500. RFID reader 18300 can be adapted to read RFID information from object 18500, a container 18600, and/or an object 18650. In certain exemplary embodiments, object 18500 can transmit RFID information to both first RFID reader 18200 and second RFID reader 18300.

Objects such as object 18400, object 18500, object 18650 can be any object associated with an RFID tag such as an appliance, food item, personal hygiene product, automotive part, toy, video game, electronic item, clothing item, hardware good, household supply, furniture, bedding, medical supply, industrial product, industrial process control hardware, software, medicine, CD, DVD, and/or book, etc.

Container 18600 can be any container associated with object 18650. For example, container 18600 can be one or more boxes, pallets, shelves, racks, trucks, shopping carts, forklifts, rail cars, trailers, and/or floor areas, etc.

System 18000 can comprise an RFID data server 18700, which can be communicatively coupled to RFID reader 18200 and second RFID reader 18300 via network 18100. RFID data server 18700 can comprise a user program 18740 and a user interface 18720. User program 18740 can be adapted to communicate with a memory device 18800, which can be communicatively coupled to RFID data server 18700 via network 18100. For example, information obtained from object 18400, object 18500, object 18650 can be stored and/or retrieved from memory device 18800 via user program 18740.

RFID data server 18700 can comprise an event manager 18760 and RFID data manager 18780. Event manager 18760 can be adapted to obtain RFID information from one or more RFID tags. RFID information can comprise information obtained from and/or related to object 18400, object 18500, object 18650. For example, RFID information can comprise a unique identifier associated with a particular object, location of the particular object, container associated with the particular object, ownership of the particular object, transactions associated with the particular object, timestamp of an information transmission, and/or a transaction type associated with the particular object, etc.

RFID data manager 18780 can be adapted to automatically populate one or more database tables with data from RFID tags stored on memory device 18800. RFID data manager 18780 can be adapted to determine whether or not a particular record in a particular database table is a duplicate of another record. For example, if object 18500 transmits RFID information to both first RFID reader 18200 and second RFID reader 18300 during an interference interval, a determination might be made that a duplicate record has been obtained. Responsive to a determination that duplicate records exist, duplicate records can be removed, marked, and/or ignored responsive to finding the duplicate records.

RFID data manager 18780 can be adapted to automatically populate one or more fields of a table by converting RFID information to one or more events. For example, when object 18650 is placed in container 18600, reader 18300 can receive RFID information regarding object 18650. RFID data manager 18780 can be adapted to generate two events: the location of object 18650 has changed, and a container associated with object 18650 has changed.

RFID data manager 18780 can be adapted to determine that one or more of object 18400, object 18500, object 18650 is missing and/or provide a last known location of one or more of object 18400, object 18500, object 18650. RFID data manager 18780 can be adapted to automatically generate one or more of a shipping notice, low inventory alert, and/or trend analysis, etc. RFID data manager 18780 can be adapted to generate, store, and/or utilize, etc. one or more schemas associated with one or more tables stored on memory device 18800.

Figure 19:
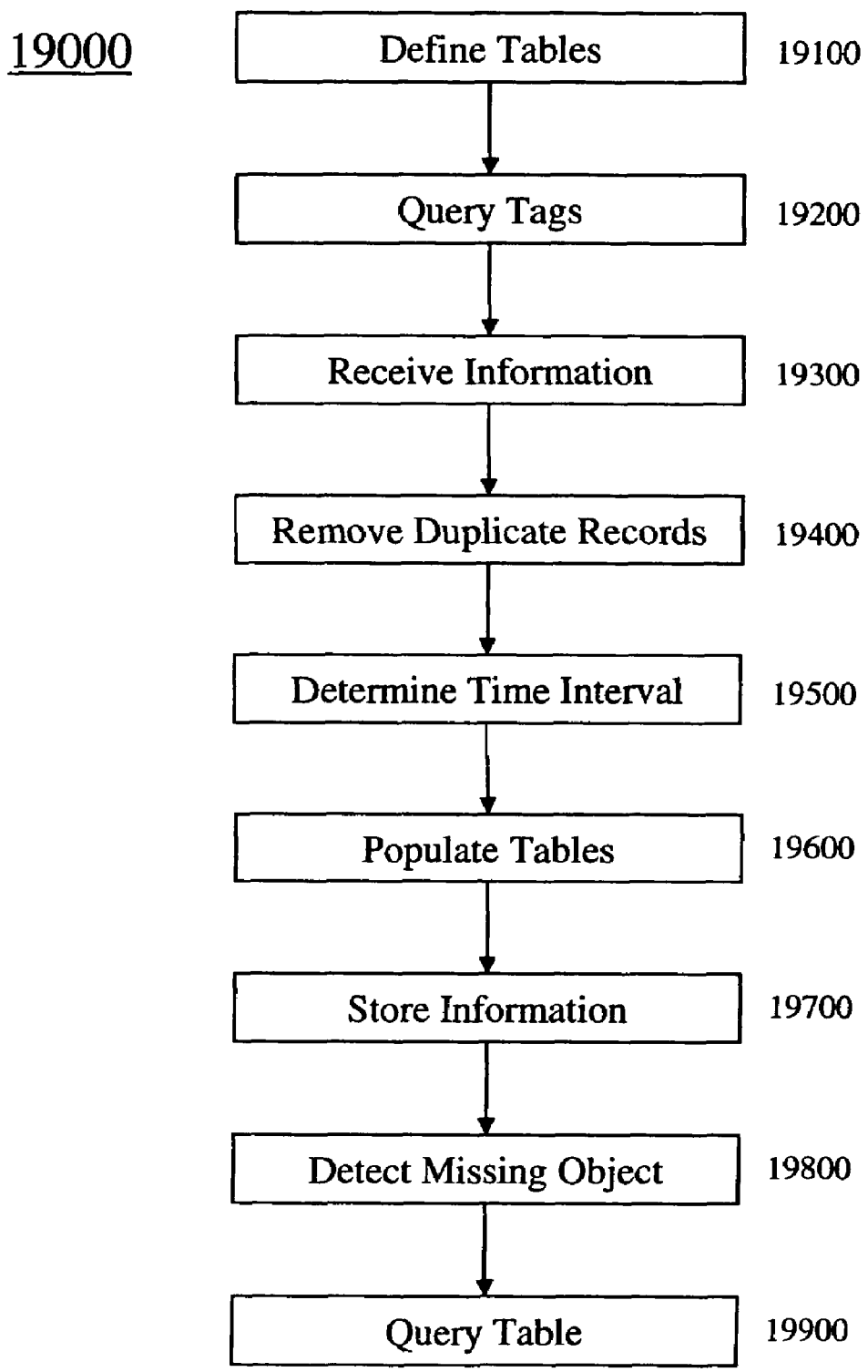
FIG. 19 is a flowchart of an exemplary embodiment of a method 19000.

FIG. 19 is a flowchart of an exemplary embodiment of a method 19000, which can be implemented via a machine readable medium. In certain exemplary embodiments, a charge can be determined and/or applied for one or more of the activities comprised in method 19000.

At activity 19100, tables can be defined according to one or more schemas. For example, a database table can comprise a plurality of records, each of the plurality of records can comprise a plurality of fields. Exemplary fields can comprise an identification of an object, identification of a particular location of the object, identification of a container associated with the object, transaction identifier, transaction type, timestamp associated with a particular transmission from an RFID tag associated with the object, explicit start time indicating when the object became associated with the particular location of the object, and/or explicit stop time indicating when the object ceased being associated with the particular location of the object.

The particular location of the object comprised by each record can be one of a plurality of potential locations. Each particular location of the object can be automatically determined responsive to the RFID information. Each record can be created upon association of the object with a different particular location of the object than that of a temporally adjacent record. The particular location can be a physical location such as one or more store shelves, floor areas, trucks, trailers, and/or a locations defined by a location of an RFID reader, etc.

The transaction identifier can comprise information related to a change in ownership, change in location, change in salability status, and/or change in container, etc. A transaction type can comprise a sale, purchase, location change, and/or container change, etc.

A containment table can also comprise a plurality of records. Each of the plurality of records in the containment table can comprise the identification of the object, identification of a container associated with the object, explicit start time indicating when the object became associated with the container, and/or explicit stop time indicating when the object ceased being associated with the container. The container comprised by each record can be one of a plurality of potential containers. Each record can be created upon association of the object with a different container associated with the object than that of a temporally adjacent record.

A transaction table can comprise a plurality of records, which can each comprise the identification of the object, a transaction identification associated with the object, and/or a transaction type associated with the transaction identification. The transaction type can be one of a plurality of potential transaction types.

A reader table can comprise a plurality of records, which can each comprise an identification of an RFID reader, an identification of a particular location of the reader, an explicit start time indicating when the reader became associated with the particular location of the reader, and/or an explicit stop time indicating when the reader ceased being associated with the particular location of the reader.

AN RFID table can comprise a plurality of records, which can each comprise an identification of an RFID reader, and/or a timestamp associated with the RFID information.

A transaction identification table can comprise a plurality of records, which can each comprise the identification of the object, a transaction identification associated with the object, and/or a timestamp associated with the RFID information.

At activity 19200, RFID tags can be queried. In certain exemplary embodiments, an RFID reader can be adapted to generate a signal adapted to request a response from one or more passive and/or active RFID tags.

At activity 19300, RFID information can be received at one or more RFID readers from one or more RFID tags. The RFID information can be automatically generatable and/or automatically receivable. The RFID information can be received periodically and/or aperiodically. The RFID information can comprise a description of the object, container comprising the object, location associated with the object, transaction regarding the object, transaction type regarding the object, and/or a timestamp associated with the RFID information, etc.

At activity 19400, duplicate records can be removed from a table. Certain exemplary embodiments can comprise automatically determining that an identification of an object and/or a particular location of the object comprised in a first record comprised in the RFID information duplicates the identification of the object and/or the particular location of the object in a second record comprised in the RFID information. The first record can be associated with a first subset of the RFID information, such as from a first reading from an RFID tag. The second record can be associated with a second subset of the RFID information, such as from a second reading from the RFID tag. The second subset of data can be obtained within an interference interval of the first subset of data. The interference interval can be an amount of time during which duplicate readings are not expected and/or are assumed to be duplicates of other readings. In certain exemplary embodiments, the interference interval can be provided and/or specified by a user.

In certain exemplary embodiments an automatic determination can be made that the identification of the object duplicates the identification of the object in a third radio frequency identification record populated with the RFID information. The first location can be associated with the first subset of data. In certain exemplary embodiments, a determination can be made that a first location associated with the first subset of data is within a predetermined distance of a second location comprised in the third subset of data The predetermined distance can be measured in one dimension, two dimensions, and/or three dimensions.

In certain exemplary embodiments, a duplicate record can be automatically removed, ignored, and/or marked once the duplicate record has been determined to exist based upon location information, container information, and/or object identification values, etc.

At activity 19500, a time interval can be determined. The time interval can be related to the RFID information. For example, the time interval can be an interference interval. In certain exemplary embodiments the time interval can define an explicit start time and/or an explicit stop time associated with one or more tables populated with data from the RFID information.

At activity 19600, tables can be populated with values comprised in the RFID information. For example, the database table can be automatically populated with values comprised in the RFID information. The tables can comprise the containment table, the transaction table, the reader table, the RFID table, and/or the transaction identification table, etc.

At activity 19700, the RFID information can be stored. In certain exemplary embodiments, the RFID information can be converted to and/or stored in a PML format, and/or an Extensible Markup Language (XML) format.

At activity 19800, missing objects can be detected. In certain exemplary embodiments, missing objects can be detected based upon not receiving an expected RFID signal from one or more particular RFID tags.

At activity 19900, one or more tables can be queried. Certain exemplary embodiments can be adapted to automatically generate a user interface. The user interface can be adapted to receive information from a user and/or create a query based upon the information received from the user. The query can be a history query, temporal snapshot query, temporal slicing query, temporal aggregate query, temporal join query, and/or containment query, etc.

Figure 20:
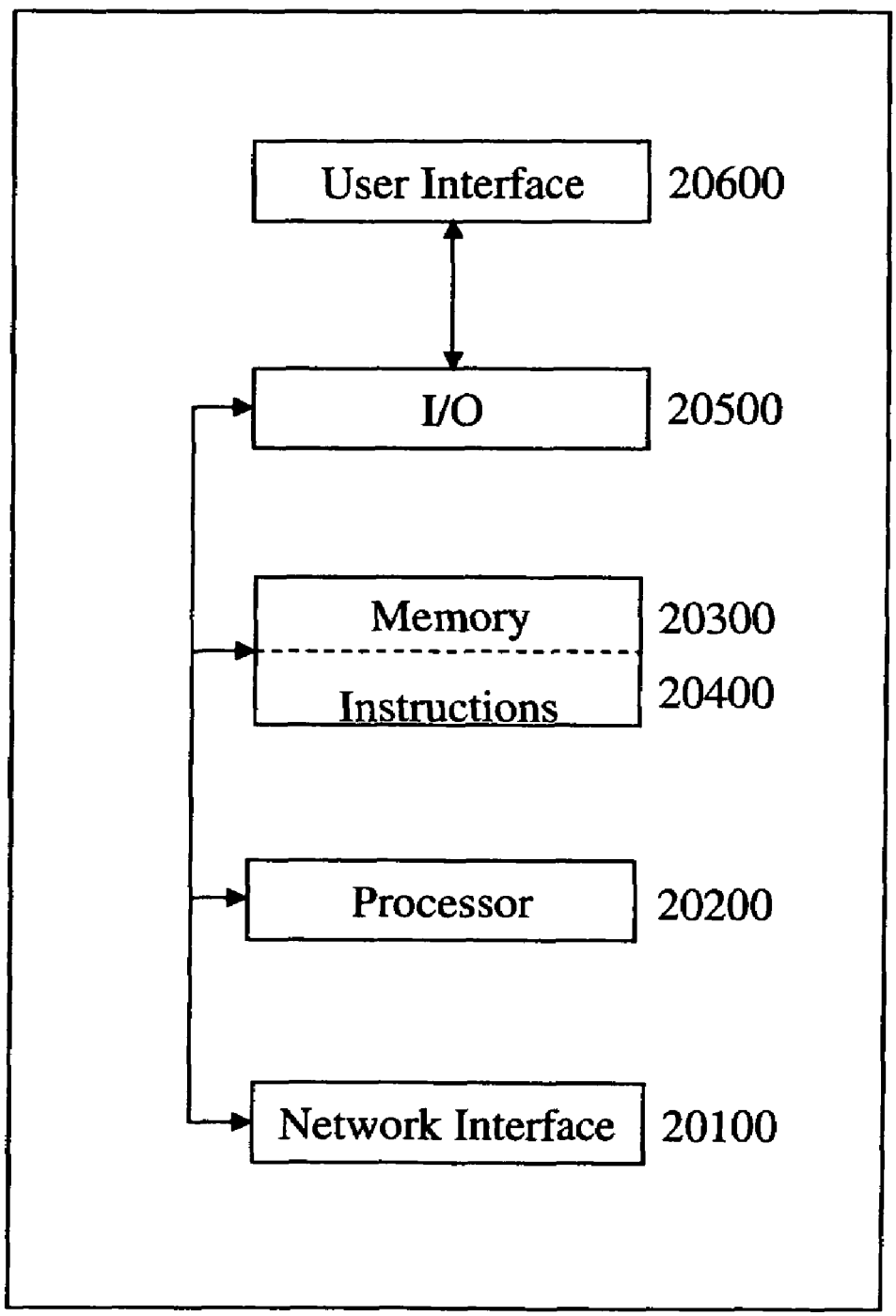
FIG. 20 is an exemplary information device 20000.

FIG. 20 is a block diagram of an exemplary embodiment of an information device 20000, which in certain operative embodiments can comprise, for example, RFID data server 18700 of FIG. 18. Information device 20000 can comprise any of numerous components, such as for example, one or more network interfaces 20100, one or more processors 20200, one or more memories 20300 containing instructions 20400, one or more input/output (I/O) devices 20500, and/or one or more user interfaces 20600 coupled to I/O device 20500, etc.

In certain exemplary embodiments, via one or more user interfaces 20600, such as a graphical user interface, a user can view a rendering of information related to managing RFID data.

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Accordingly, the descriptions and drawings are to be regarded as illustrative in nature, and not as restrictive. Moreover, when any number or range is described herein, unless clearly stated otherwise, that number or range is approximate.

When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method comprising a plurality of activities, the plurality of activities comprising:

automatically populating a first database table with data obtained from one or more radio identification readers, said first database table comprising a first plurality of records, each of said first plurality of records comprising an identification of an object, an identification of a particular location of the object, an explicit start time indicating when the object became associated with the particular location of the object, and an explicit stop time indicating when the object ceased being associated with the particular location of the object, the particular location of the object comprised by each record one of a plurality of potential locations, each particular location of the object automatically determined responsive to automatically generatable, automatically receivable, radio frequency identification information, each record created upon association of the object with a different particular location of the object than that of a temporally adjacent record;

automatically populating a second database table with said data obtained from the one or more radio identification readers, said second database table comprising a second plurality of records, each of said second plurality of records comprising said identification of the object, an identification of a container associated with the object, an explicit start time indicating when the object became associated with the container, and an explicit stop time indicating when the object ceased being associated with the container, the container comprised by each record one of a plurality of potential containers, each record created upon association of the object with a different container associated with the object than that of a temporally adjacent record; and automatically determining that said identification of the object and the particular location of the object comprised in a first radio frequency identification record duplicates the identification of the object and the particular location of the object in a second radio frequency identification record, said first radio frequency identification record associated with a first subset of data from a first radio identification reader, said second radio frequency identification record associated with a second subset of data from a second radio identification reader, said second subset of data obtained within a predetermined interference interval of said first subset of data.

2. The method of claim 1, further comprising:
automatically removing said first radio frequency identification record from said first database table responsive to said automatically determining activity.

3. The method of claim 1, further comprising:
receiving said predetermined interference interval.

4. The method of claim 1, further comprising:
automatically populating a third database table with said data obtained from the one or more radio identification readers, said third database table comprising a third plurality of records, each of said third plurality of records comprising said identification of the object, a transaction identification associated with the object, and a transaction type associated with each transaction identification, said transaction type one of a plurality of potential transaction types.

5. The method of claim 1, further comprising:
automatically populating a third database table with said data obtained from the one or more radio identification readers, said third database table comprising a third plurality of records, each of said third plurality of records comprising an identification of a reader adapted to obtain said radio frequency identification information, an identification of a particular location of the reader, the explicit start time indicating when the reader became associated with the particular location of the reader, and the explicit stop time indicating when the reader ceased being associated with the particular location of the reader.

6. The method of claim 1, further comprising:
automatically populating a third database table with said data obtained from the one or more radio identification readers, said third database table comprising a third plurality of records, each of said third plurality of records comprising said automatically generatable, automatically receivable, radio frequency identification information, an identification of a reader associated with said automatically generatable, automatically receivable, radio frequency identification information, and a timestamp associated with said automatically generatable, automatically receivable, radio frequency identification information.

7. The method of claim 1, further comprising:
automatically populating a third database table with said data obtained from the one or more radio identification readers, said third database table comprising a third plurality of records, each of said third plurality of records comprising said identification of the object, a transaction identification associated with the object, and a timestamp associated with said automatically generatable, automatically receivable, radio frequency identification information.

8. The method of claim 1, further comprising:
providing a user interface adapted to generate a history query.

9. The method of claim 1, further comprising:
providing a user interface adapted to generate a temporal snapshot query.

10. The method of claim 1, further comprising:
providing a user interface adapted to generate a temporal slicing query.

11. The method of claim I, further comprising:
providing a user interface adapted to generate a temporal aggregate query.

12. The method of claim 1, further comprising:
providing a user interface adapted to generate a temporal join query.

13. The method of claim 1, further comprising:
providing a user interface adapted to generate a query.

14. The method of claim 1, further comprising:
querying a radio frequency identification tag to obtain said automatically generatable, automatically receivable, radio frequency identification information.

15. The method of claim 1, further comprising:
receiving said automatically generatable, automatically receivable, radio frequency identification information.

16. The method of claim 1, further comprising:
storing said automatically generatable, automatically receivable, radio frequency identification information.

17. The method of claim 1, further comprising:
automatically receiving said automatically generatable, automatically receivable, radio frequency identification information from a plurality of radio frequency identification information readers.

18. The method of claim 1, further comprising:
storing said automatically generatable, automatically receivable, radio frequency identification information in an Extensible Markup Language format.

19. The method of claim 1, further comprising:
automatically detecting that the object is missing.

20. The method of claim 1, further comprising:
automatically determining a time interval related to said automatically generatable, automatically receivable, radio frequency identification information.

21. The method of claim 1, wherein said identification of the object corresponds to a record in a third database table, said record in said third database table comprising a description of the object, said object one of a plurality of objects retained by the container, the container one of a box, pallet, shelf, rack, truck, shopping cart, forklift, rail car, or trailer.

22. The method of claim 1, wherein said identification of the particular location of the object corresponds to a record in a third database table, said record in said third database table comprising an owner of the particular location.

23. A system comprising:
an event manager adapted to obtain automatically generatable, automatically receivable, radio frequency identification information; and
an application integration interface adapted to:
automatically populate a first database table with data obtained from one or more radio identification readers, said first database table comprising a first plurality of records, each of said first plurality of records comprising an identification of an object, an identification of a particular location of the object, an explicit start time indicating when the object became associated with the particular location of the object, and an explicit stop time indicating when the object ceased being associated with the particular location of the object, the particular location of the object comprised by each record one of a plurality of potential locations, each particular location of the object automatically determined responsive to automatically generatable, automatically receivable, radio frequency identification information, each record created upon association of the object with a different particular location of the object than that of a temporally adjacent record;
automatically populate a second database table with said data obtained from the one or more radio identification readers, said second database table comprising a second plurality of records, each of said second plurality of records comprising said identification of the object, an identification of a container associated with the object, an explicit start time indicating when the object became associated with the container, and an explicit stop time indicating when the object ceased being associated with the container, the container comprised by each record one of a plurality of potential containers, each record created upon association of the object with a different container associated with the object than that of a temporally adjacent record; and
automatically determine that said identification of the object and the particular location of the object comprised in a first radio frequency identification record duplicates the identification of the object and the particular location of the object in a second radio frequency identification record, said first radio frequency identification record associated with a first subset of data from a first radio identification reader, said second radio frequency identification record associated with a second subset of data from a second radio identification reader, said second subset of data obtained within a predetermined interference interval of said first subset of data.

24. A system comprising:
a means for obtaining automatically generatable, automatically receivable, radio frequency identification information; and
an interface adapted to:
automatically populate a first database table with data obtained from one or more radio identification readers, said first database table comprising a first plurality of records, each of said first plurality of records comprising an identification of an object, an identification of a particular location of the object, an explicit start time indicating when the object became associated with the particular location of the object, and an explicit stop time indicating when the object ceased being associated with the particular location of the object, the particular location of the object comprised by each record one of a plurality of potential locations, each particular location of the object automatically determined responsive to automatically generatable, automatically receivable, radio frequency identification information, each record created upon association of the object with a different particular location of the object than that of a temporally adjacent record;

automatically populate a second database table with said data obtained from the one or more radio identification readers, said second database table comprising a second plurality of records, each of said second plurality of records comprising said identification of the object, an identification of a container associated with the object, an explicit start time indicating when the object became associated with the container, and an explicit stop time indicating when the object ceased being associated with the container, the container comprised by each record one of a plurality of potential containers, each record created upon association of the object with a different container associated with the object than that of a temporally adjacent record; and automatically determine that said identification of the object and the particular location of the object comprised in a first radio frequency identification record duplicates the identification of the object and the particular location of the object in a second radio frequency identification record, said first radio frequency identification record associated with a first subset of data from a first radio identification reader, said second radio frequency identification record associated with a second subset of data from a second radio identification reader, said second subset of data obtained within a predetermined interference interval of said first subset of data.

25. A computer-readable medium storing machine instructions for activities executable by a processor of a system comprising:

automatically populating a first database table with data obtained from one or more radio identification readers, said first database table comprising a first plurality of records, each of said first plurality of records comprising an identification of an object, an identification of a particular location of the object, an explicit start time indicating when the object became associated with the particular location of the object, and an explicit stop time indicating when the object ceased being associated with the particular location of the object, the particular location of the object comprised by each record one of a plurality of potential locations, each particular location of the object automatically determined responsive to automatically generatable, automatically receivable, radio frequency identification information, each record created upon association of the object with a different particular location of the object than that of a temporally adjacent record;

automatically populating a second database table with said data obtained from the one or more radio identification readers, said second database table comprising a second plurality of records, each of said second plurality of records comprising said identification of the object, an identification of a container associated with the object, an explicit start time indicating when the object became associated with the container, and an explicit stop time indicating when the object ceased being associated with the container, the container comprised by each record one of a plurality of potential containers, each record created upon association of the object with a different container associated with the object than that of a temporally adjacent record; and automatically determining that said identification of the object and the particular location of the object comprised in a first radio frequency identification record duplicates the identification of the object and the particular location of the object in a second radio frequency identification record, said first radio frequency identification record associated with a first subset of data from a first radio identification reader, said second radio frequency identification record associated with a second subset of data from a second radio identification reader, said second subset of data obtained within a predetermined interference interval of said first subset of data.

26. A method comprising a plurality of activities comprising:

automatically determining a charge for:

automatically populating a first database table with data obtained from one or more radio identification readers, said first database table comprising a first plurality of records, each of said first plurality of records comprising an identification of an object, an identification of a particular location of the object, an explicit start time indicating when the object became associated with the particular location of the object, and an explicit stop time indicating when the object ceased being associated with the particular location of the object, the particular location of the object comprised by each record one of a plurality of potential locations, each particular location of the object automatically determined responsive to automatically generatable, automatically receivable, radio frequency identification information, each record created upon association of the object with a different particular location of the object than that of a temporally adjacent record;

automatically populating a second database table with said data obtained from the one or more radio identification readers, said second database table comprising a second plurality of records, each of said second plurality of records comprising said identification of the object, an identification of a container associated with the object, an explicit start time indicating when the object became associated with the container, and an explicit stop time indicating when the object ceased being associated with the container, the container comprised by each record one of a plurality of potential containers, each record created upon association of the object with a different container associated with the object than that of a temporally adjacent record; and automatically determining that said identification of the object and the particular location of the object comprised in a first radio frequency identification record duplicates the identification of the object and the particular location of the object in a second radio frequency identification record, said first radio frequency identification record associated with a first subset of data from a first radio identification reader, said second radio frequency identification record associated with a second subset of data from a second radio identification reader, said second subset of data obtained within a predetermined interference interval of said first subset of data.

* * * * *